United States Patent
Novlan et al.

(10) Patent No.: US 10,020,969 B2
(45) Date of Patent: Jul. 10, 2018

(54) METHODS AND APPARATUS FOR DISCOVERY AND MEASUREMENT IN CELLULAR NETWORKS

(71) Applicant: Samsung Electronics Co., Ltd., Suwon-si, Gyeonggi-do (KR)

(72) Inventors: Thomas David Novlan, Dallas, TX (US); Boon Loong Ng, Plano, TX (US); Ying Li, Richardson, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 88 days.

(21) Appl. No.: 14/657,750

(22) Filed: Mar. 13, 2015

(65) Prior Publication Data

US 2015/0264592 A1    Sep. 17, 2015

Related U.S. Application Data

(60) Provisional application No. 61/953,420, filed on Mar. 14, 2014, provisional application No. 62/035,294, (Continued)

(51) Int. Cl.
*H04W 28/08* (2009.01)
*H04L 27/26* (2006.01)
(Continued)

(52) U.S. Cl.
CPC ......... *H04L 27/2601* (2013.01); *H04W 24/10* (2013.01); *H04W 52/0206* (2013.01);
(Continued)

(58) Field of Classification Search
CPC . H04W 24/08; H04W 8/005; H04W 72/1268; H04W 72/1273; H04W 24/10;
(Continued)

(56) References Cited

U.S. PATENT DOCUMENTS 9,712,262 B2 * 7/2017 Yi .......................... H04B 17/318
2014/0056243 A1 * 2/2014 Pelletier ................. H04W 74/04
370/329

(Continued)

OTHER PUBLICATIONS

International Search Report dated May 28, 2015 in connection with PCT/KR2015/002518; 3 pages.

(Continued)

*Primary Examiner* — Walli Butt

(57) ABSTRACT

Adaptation of measurement procedures for cell detection and association provide more accurate and frequent reports for use by the network, to enhance cell association. A user equipment receives, within a configured measurement bandwidth, orthogonal frequency division multiplexing symbols comprising discovery reference signals (DRS). For subframes in which the DRS are transmitted, a discovery reference signal received quality (D-RSRQ) is determined from the DRS within the received symbols as a ratio of discovery reference signal received power (D-RSRP) to carrier discovery received signal strength indicator (D-RSSI), where the D-RSRP is measured in symbols containing DRS resource elements and the D-RSSI is measured in all symbols in subframes containing the DRS. For a UE configured to also measure common reference signals, non-DRS measurements are suspended upon deactivation of a secondary cell, and measurement timing of the DRS during a deactivation period is based on a measurement timing parameter.

24 Claims, 6 Drawing Sheets

Related U.S. Application Data filed on Aug. 8, 2014, provisional application No. 62/039,874, filed on Aug. 20, 2014.

(51) Int. Cl.
*H04W 24/10* (2009.01)
*H04W 52/02* (2009.01)

(52) U.S. Cl.
CPC .......... *Y02D 70/00* (2018.01); *Y02D 70/1226* (2018.01); *Y02D 70/1262* (2018.01); *Y02D 70/21* (2018.01); *Y02D 70/24* (2018.01)

(58) Field of Classification Search
CPC ........... H04W 52/0206; H04L 27/2601; Y02D 70/24; Y02D 70/1226; Y02D 70/21; Y02D 70/00; Y02D 70/1262
USPC ....... 370/252, 312, 329; 435/325, 368, 6.11, 435/7.9
See application file for complete search history.

(56) References Cited

U.S. PATENT DOCUMENTS

| | | | | |
|---|---|---|---|---|
| 2014/0064131 A1* | 3/2014 | Kim | ...................... | H04L 1/0026 370/252 |
| 2015/0092655 A1* | 4/2015 | Liao | ...................... | H04J 11/005 370/312 |
| 2015/0215799 A1* | 7/2015 | Kazmi | ................... | H04W 24/08 370/252 |
| 2015/0215856 A1* | 7/2015 | Kim | ...................... | H04W 48/16 370/252 |
| 2015/0223149 A1* | 8/2015 | Liu | ...................... | H04W 48/12 370/252 |

OTHER PUBLICATIONS

Samsung; 3GPP TSG-RAN WG1#76, R1-140367; "Overview of small cell on/off scenarios and procedures"; Prague, Czech Republic, Feb. 10-14, 2014, 11 pages.

MediaTek, Inc.; 3GPP TSG-RAN WG1 #76, R1-140245; "Performance evaluation for small cell on/off operation considering procedure and discovery/measurement enhancements"; Prague, Czech Republic, Feb. 10-14, 2014; 5 pages.

ETRI; 3GPP TSG RAN WG1 Meeting #76, R1-140213; "Discovery signal design for small cell on/off"; Prague, Czech Republic, Feb. 10-14, 2014; 4 pages.

Samsung; 3GPP TSG-RAN WG1#76, R-140369; "Discovery signal requirements for small cells"; Prague, Czech Republic, Feb. 10-14, 2014; 5 pages.

3GPP TS 36.211; ETSI TS 136 211 V11.2.0; Technical Specification; LTE; Evolved Universal Terrestrial Radio Access (E-UTRA); Physical channels and modulation; Apr. 2013; 111 pgs.

3GPP TS 36.212; ETSI TS 136 212 V11.2.0; Technical Specification; LTE; Evolved Universal Terrestrial Radio Access (E-UTRA); Multiplexing and channel coding; Apr. 2013; 84 pgs.

3GPP TS 36.213; ETSI TS 136 213 V11.2.0; Technical Specification; LTE; Evolved Universal Terrestrial Radio Access (E-UTRA); Physical layer procedures; Apr. 2013; 175 pgs.

3GPP TS 36.214; ETSI TS 136 214 V11.1.0; Technical Specification; LTE; Evolved Universal Terrestrial Radio Access (E-UTRA); Physical layer; Measurements; Feb. 2013; 16 pgs.

3GPP TS 36.300; ETSI TS 136 300 V11.5.0; Technical Specification; LTE; Evolved Universal Terrestrial Radio Access (E-UTRA); and Evolved Universal Terrestrial Radio Access Network (E-UTRAN); Overall description; Stage 2; Apr. 2013; 223 pgs.

3GPP TS 36.321; ETSI TS 136 321 V11.2.0; Technical Specification; LTE; Evolved Universal Terrestrial Radio Access (E-UTRA); Medium Access Control (MAC) protocol specification; Apr. 2013; 58 pgs.

3GPP TS 36.331; ETSI TS 136 331 V11.3.0; Technical Specification; LTE; Evolved Universal Terrestrial Radio Access (E-UTRA); Radio Resource Control (RRC); Protocol specification; Apr. 2013; 348 pgs.

3GPP TS 36.133; ETSI TS 136 133 V11.4.0; Technical Specification; LTE; Evolved Universal Terrestrial Radio Access (E-UTRA); Requirements for support of radio resource management; Apr. 2013; 678 pages.

3GPP TR 36.814 V9.0.0; Technical Specification Group Radio Access Network; Evolved Universal Terrestrial Radio Access (E-UTRA); Further advancements for E-UTRA physical layer aspects; Release 9; Mar. 2010; 104 pgs.

Extended European Search Report issued for EP 15738563.4 dated Jan. 25, 2016, 9 pgs.

LG Electronics, Inc., "DRS Measurement Configurability", R2-142763, 3GPP TSG-RAN WG2 #87, Aug. 9, 2014, 2 pgs.

NTT DoCoMo, Small Cell Discovery for Efficient Small Cell On/Off Operation:, R1-133457, 3GPP TSG RAN WG1 Meeting #74, Aug. 10, 2013, 8 pgs.

Huawei et al., "Enhancements of RRM Measurements for Small Cell On/Off", R1-140038, 3GPP TSG RAN WG1 Meeting #76, Feb. 9, 2014, 4 pgs.

Notice of Preliminary Rejection dated Jun. 29, 2016 in connection with Korean Patent Application No. 10-2015-7020533, 10 pages.

Fujitsu, "Discussion on Discovery and Measurement for Small Cell On/Off", 3GPP TSG RAN WG1 Meeting #76, R1-140191, Prague, Czech Republic, Feb. 10-14, 2014, 6 pages.

\* cited by examiner

METHODS AND APPARATUS FOR DISCOVERY AND MEASUREMENT IN CELLULAR NETWORKS

This application claims priority to and hereby incorporates by reference U.S. Provisional Patent Application No. 61/953,420, filed Mar. 14, 2014, entitled "METHODS AND APPARATUS FOR DISCOVERY AND MEASUREMENT IN CELLULAR NETWORKS," U.S. Provisional Patent Application No. 62/035,294, filed Aug. 8, 2014, entitled "METHODS AND APPARATUS FOR DISCOVERY AND MEASUREMENT IN CELLULAR NETWORKS," and U.S. Provisional Patent Application No. 62/039,874, filed Aug. 20, 2014, entitled "METHODS AND APPARATUS FOR DISCOVERY AND MEASUREMENT IN CELLULAR NETWORKS."

TECHNICAL FIELD

The present disclosure relates generally to wireless communication systems, and more specifically to configuration of measurement and reporting based on discovery signals within a wireless communications system.

BACKGROUND

In order to provide a network with the results of measurements taken by a mobile station (or "user equipment") in a wireless communications system during a given measurement period, a configurable relationship is defined between a set of measurement configurations and reporting configurations. However, different maximum measurement periods may be specified for intra-frequency versus inter-frequency measurement, and different types of sampling (e.g., consecutive versus non-consecutive).

There is, therefore, a need in the art for improved support for configuration of measurement and reporting based on discovery signals.

SUMMARY

Adaptation of measurement procedures for cell detection and association provide more accurate and frequent reports for use by the network, to enhance cell association. A user equipment receives, within a configured measurement bandwidth, orthogonal frequency division multiplexing symbols comprising discovery reference signals (DRS). For subframes in which the DRS are transmitted, a discovery reference signal received quality (D-RSRQ) is determined from the DRS within the received symbols as a ratio of discovery reference signal received power (D-RSRP) to carrier discovery received signal strength indicator (D-RSSI), where the D-RSRP is measured in symbols containing DRS resource elements and the D-RSSI is measured in all symbols in subframes containing the DRS. For a UE configured to also measure common reference signals, non-DRS measurements are suspended upon deactivation of a secondary cell, and measurement timing of the DRS during a deactivation period is based on a measurement timing parameter.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the teem "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
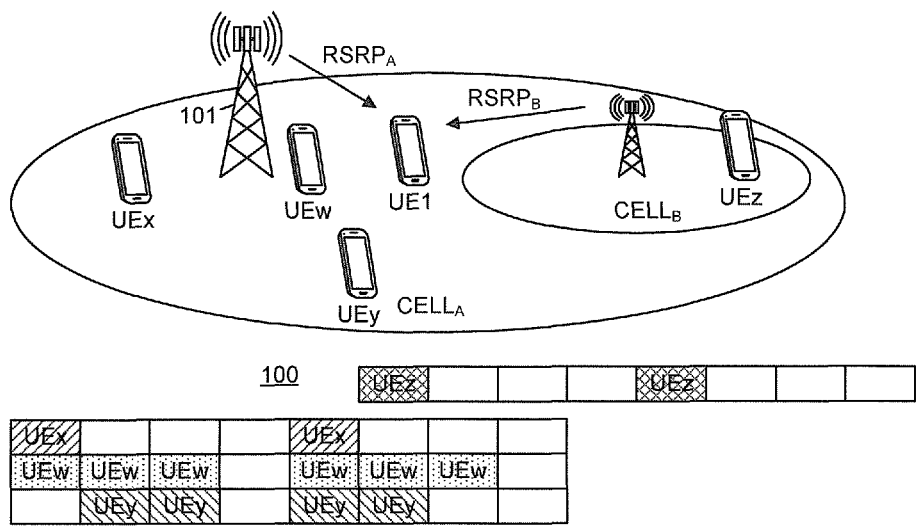
FIG. 1 illustrates traffic and signal quality metrics for cell association in a heterogeneous network.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents are incorporated herein by reference:

[REF1] 3GPP TS 36.211 v11.2.0, "E-UTRA, Physical channels and modulation."

[REF2] 3GPP TS 36.212 v11.2.0, "E-UTRA, Multiplexing and Channel coding."

[REF3] 3GPP TS 36.213 v11.2.0, "E-UTRA, Physical Layer Procedures."

[REF4] 3GPP TS 36.214 v11.1.0, "E-UTRA, Physical Layer Measurement."

[REF5] 3GPP TS 36.300 V11.5.0, "E-UTRA and E-UTRAN, Overall description. Stage 2."

[REF6] 3GPP TS 36.321 V11.2.0, "E-UTRA, MAC protocol specification."

[REF7] 3GPP TS 36.331 V11.3.0, "E-UTRA, RRC Protocol specification."

[REF8] 3GPP TS 36.133 V11.4.0, "E-UTRA, Requirements for support of radio resource management."

[REF9] 3GPP TS 36.814 V9.0.0, "E-UTRA, Further advancements for E-UTRA physical layer aspects."

ABBREVIATIONS

ACK Acknowledgement
ARQ Automatic Repeat Request
CA Carrier Aggregation
C-RNTI Cell RNTI
CRS Common Reference Signal
CSI Channel State Information
CSI-RS Channel State Information Reference Signal
D2D Device-to-Device
DCI Downlink Control Information
DL Downlink
DMRS Demodulation Reference Signal
DRS Discovery Reference Signal
EPDCCH Enhanced PDCCH
FDD Frequency Division Duplexing
HARQ Hybrid ARQ
IE Information Element
MCS Modulation and Coding Scheme
MBSFN Multimedia Broadcast multicast service Single Frequency Network
O&M Operation and Maintenance
PCell Primary Cell
PCI Physical Cell Identity
PDCCH Physical Downlink Control Channel
PDSCH Physical Downlink Shared Channel
PMCH Physical Multicast Channel
PRB Physical Resource Block
PSS Primary Synchronization Signal
PUCCH Physical Uplink Control Channel
PUSCH Physical Uplink Shared Channel
QoS Quality of Service
RACH Random Access Channel
RNTI Radio Network Temporary Identifier
RRC Radio Resource Control
RRM Radio Resource Measurement
RS Reference Signals
RSRP Reference Signal Received Power
RSRQ Reference Signal Received Quality
SCell Secondary Cell
SIB System Information Block
SINR Signal to Interference and Noise Ratio
SSS Secondary Synchronization Signal
SR Scheduling Request
SRS Sounding RS
TA Timing Advance
TAG Timing Advance Group
TDD Time Division Duplexing
TPC Transmit Power Control
UCI Uplink Control Information
UE User Equipment
UL Uplink
UL-SCH UL Shared Channel In Rel-8-11 Long Term Evolution (LTE), the UE initiates cell search by scanning for PSS and then SSS to identify a set of candidate cell identities (cell IDs). Given a candidate cell ID, the UE then attempts to detect and measure the Cell-Specific Reference Signals (CRS) of the candidate cell. In Rel-12 of LTE, a new discovery reference signal (DRS) may be introduced to improve the reliability of cell detection, as well as to facilitate on/off transition of cells to improve energy efficiency and reduce interference. If the signal quality (signal power, RSRP) of the cell meets a certain criteria, the UE attempts to access the cell or, if the UE has already connected to a serving cell, it may report its measurement result as well as the identity of the cell to the network.

When small cells (e.g., pico cells, femto cells, nano cells) are deployed in a cluster in order to handle the traffic in a hotzone (e.g., crowded shopping mall, stadium, etc.), there is a need to enhance UE capability of accessing the small cells. This is because when small cells are deployed in a cluster, traffic dynamics may be frequently changing and also in the case of user mobility, the set of potential cells for connection may also be varying. The network decision of which cell to associate a particular user with may depend on multiple factors, including traffic type, network load, and especially UE measurements including RSRP and RSRQ. FIG. 1 illustrates a two-cell scenario highlighting the multiple factors which need to be considered for efficient user association and load balancing. At the boundaries of macro Cell A and small Cell B, UE1 is taking measurements to determine its cell association. The RSRP of Cell A is greater than that of Cell B, but there are significantly more active users being served by Cell A than Cell B. Thus signal strength alone may not be sufficient to make the most beneficial association decision from a throughput perspective because, depending on what resources and duration UE1 takes measurements, varying levels of signal quality and/or resource utilization may be observed.

This is further compounded assuming Cell A and Cell B may be switching between on and off states and UE1's measurements may be different depending on the network state and whether the DRS transmissions are coordinated between cells.

Enhancement to cell association can be achieved by adapting measurement procedures to provide more accurate and frequent reports that may be used by the network. In this disclosure, procedures and methods are disclosed that introduce the adaptation of measurement for cell detection and association.

In order to provide a network with the results of the measurements taken during a given measurement period, there is a configurable relationship between a set of measurement configurations and reporting configurations [REF7]:

"The UE reports measurement information in accordance with the measurement configuration as provided by E-UTRAN. E-UTRAN provides the measurement configuration applicable for a UE in RRC_CONNECTED by means of dedicated signaling, i.e., using the RRC-ConnectionReconfiguration message.

The UE can be requested to perform the following types of measurements:

Intra-frequency measurements: measurements at the downlink carrier frequency(ies) of the serving cell(s).

Inter-frequency measurements: measurements at frequencies that differ from any of the downlink carrier frequency(ies) of the serving cell(s).

Inter-RAT measurements of UTRA frequencies.

Inter-RAT measurements of GERAN frequencies.

Inter-RAT measurements of CDMA2000 HRPD or CDMA2000 1xRTT frequencies.

The measurement configuration includes the following parameters:

1. Measurement objects: The objects on which the UE shall perform the measurements.

For intra-frequency and inter-frequency measurements a measurement object is a single E-UTRA carrier frequency. Associated with this carrier frequency, E-UTRAN can configure a list of cell specific offsets and a list of 'blacklisted' cells. Blacklisted cells are not considered in event evaluation or measurement reporting.

For inter-RAT UTRA measurements a measurement object is a set of cells on a single UTRA carrier frequency.

For inter-RAT GERAN measurements a measurement object is a set of GERAN carrier frequencies.

For inter-RAT CDMA2000 measurements a measurement object is a set of cells on a single (HRPD or 1xRTT) carrier frequency.

NOTE 1: Some measurements using the above mentioned measurement objects, only concern a single cell, e.g., measurements used to report neighboring cell system information, PCell UE Rx-Tx time difference.

2. Reporting configurations: A list of reporting configurations where each reporting configuration consists of the following:

Reporting criterion: The criterion that triggers the UE to send a measurement report. This can either be periodical or a single event description.

Reporting format: The quantities that the UE includes in the measurement report and associated information (e.g., number of cells to report).

3. Measurement identities: A list of measurement identities where each measurement identity links one measurement object with one reporting configuration. By configuring multiple measurement identities it is possible to link more than one measurement object to the same reporting configuration, as well as to link more than one reporting configuration to the same measurement object. The measurement identity is used as a reference number in the measurement report.

4. Quantity configurations: One quantity configuration is configured per RAT type. The quantity configuration defines the measurement quantities and associated filtering used for all event evaluation and related reporting of that measurement type. One filter can be configured per measurement quantity.

5. Measurement gaps: Periods that the UE may use to perform measurements, i.e., no (UL, DL) transmissions are scheduled.

E-UTRAN only configures a single measurement object for a given frequency, i.e., it is not possible to configure two or more measurement objects for the same frequency with different associated parameters, e.g., different offsets and/or blacklists. E-UTRAN may configure multiple instances of the same event e.g., by configuring two reporting configurations with different thresholds.

The UE maintains a single measurement object list, a single reporting configuration list, and a single measurement identities list. The measurement object list includes measurement objects, that are specified per RAT type, possibly including intra-frequency object(s) (i.e., the object(s) corresponding to the serving frequency(ies)), inter-frequency object(s) and inter-RAT objects. Similarly, the reporting configuration list includes E-UTRA and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells:

1. The serving cell(s)—these are the PCell and one or more SCells, if configured for a UE supporting CA.

2. Listed cells—these are cells listed within the measurement object(s).

3. Detected cells—these are cells that are not listed within the measurement object(s) but are detected by the UE on the carrier frequency(ies) indicated by the measurement object(s).

For E-UTRA, the UE measures and reports on the serving cell(s), listed cells and detected cells."

Different maximum UE measurement periods have been specified in 3$^{rd}$ Generation Partnership Project (3GPP) standards specification for intra-frequency and inter-frequency measurement, taking into account tradeoffs between UE complexity/capability and the required RSRP/RSRQ measurement accuracy [REF8]. For instance, a longer measurement period is needed in the case of inter-frequency measurement to allow a UE with measurement gap to obtain sufficient number of samples to meet the RSRP/RSRQ measurement accuracy requirement. For intra-frequency measurement (including measurement of multiple carrier frequencies aggregated in a carrier aggregation operation), a maximum measurement period of 200 milliseconds (ms) is defined assuming measurement of 6 physical resource blocks without the DRX (Discontinuous Reception) feature configured. For inter-frequency measurement, a maximum of 480 ms per carrier frequency is defined for the same assumption.

Figure 2:
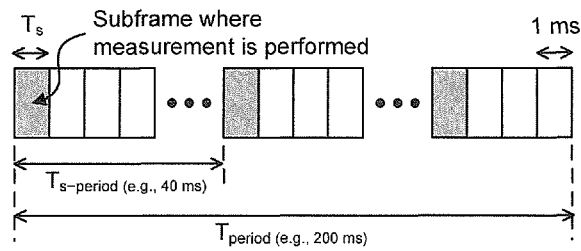
FIG. 2 illustrates measurement sampling during a UE measurement period without any measurement gap.

As an illustrative example, a UE may have a measurement period of $T_{period}$ and may utilize N sampling intervals of $T_s$ (e.g., 1 ms) to obtain a sufficiently accurate measurement (e.g., RSRP/RSRQ) for every measurement period. FIG. 2 illustrates a measurement period $T_{period}$ wherein the UE performs the measurement of $T_s$ subframe with sampling periodicity of $T_{s\text{-}period}$. For example, for the case of $T_{period}$=200 ms, $T_{s\text{-}period}$=40 ms and $T_s$=1 ms, the L1 measurement result is generated with 5 measurement subframes over the measurement period.

Figure 3:
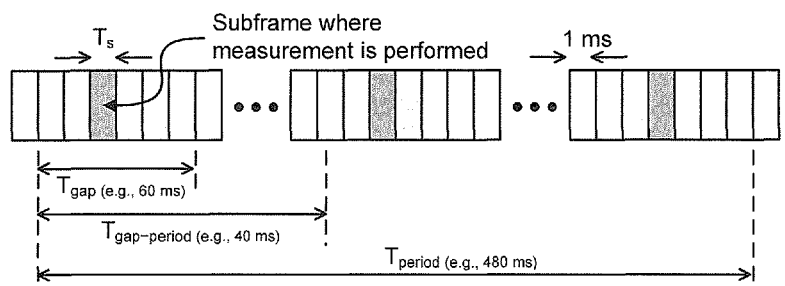
FIG. 3 illustrates measurement sampling during a UE measurement period with configured measurement gap.

In a second example, a UE may utilize non-consecutive sampling in the event a measurement gap pattern is configured. This is beneficial in the case of inter-frequency measurement for example when a UE needs to switch its RF front end to a different frequency and cannot receive or transmit on the current serving frequency. FIG. 3 illustrates a measurement period wherein the UE performs the sampling every $T_{gap}$ ms, where $T_{gap}$ is derived from a configured measurement gap pattern.

For the purpose of assisting load shifting and cell association, novel Radio Resource Measurement (RRM) methods are proposed. The physical signals used for RRM can be the Cell-Specific Reference Signal (CRS), the Positioning Reference Signal (PRS), the Channel State Information Reference Signal (CSI-RS), or a modified existing or newly designed physical signal. Hereafter the physical signal used for RRM is called RRM RS.

A network can configure a UE to measure RRM RS from multiple cells to generate a signal quality measurement such as RSRP and/or RSRQ and/or SINR of each cell. For a small cell deployment scenario, the cells to be measured by the UE can be from a same cluster of small cells or can be from multiple clusters of small cells. A UE reports measurement results to a network when a reporting criterion is met, e.g., measurement reporting can be triggered when a RSRP value is greater than a threshold that can be configured by the network.

As defined in [REF4], the RSRP allows direct measurement of the reference signals transmitted by a serving cell, giving an indication of the signal strength at the measuring UE:

| | |
|---|---|
| Definition | Reference signal received power (RSRP), is defined as the linear average over the power contributions (in Watts [W]) of the resource elements that carry cell-specific reference signals within the considered measurement frequency bandwidth.<br>For RSRP determination the cell-specific reference signals R0 according to TS 36.211 [3] shall be used. If the UE can reliably detect that R1 is available it may use R1 in addition to R0 to determine RSRP.<br>The reference point for the RSRP shall be the antenna connector of the UE.<br>If receiver diversity is in use by the UE, the reported value shall not be lower than the corresponding RSRP of any of the individual diversity branches. |
| Applicable for | RRC_IDLE intra-frequency,<br>RRC_IDLE inter-frequency,<br>RRC_CONNECTED intra-frequency,<br>RRC_CONNECTED inter-frequency |

Also, as defined in [4], the RSRQ is a metric which provides a weighted ratio of the RSRP and the RSSI. This allows the network to assess the relative signal strength of the UE as compared to the strength of interfering cells and load of the serving cell within the measurement period of the UE:

| | |
|---|---|
| Definition | Reference Signal Received Quality (RSRQ) is defined as the ratio N × RSRP/(E-UTRA carrier RSSI), where N is the number of resource blocks (RBs) of the E-UTRA carrier RSSI measurement bandwidth. The measurements in the numerator and denominator shall be made over the same set of resource blocks.<br>E-UTRA Carrier Received Signal Strength Indicator (RSSI), comprises the linear average of the total received power (in Watts [W]) observed only in OFDM symbols containing reference symbols for antenna port 0, in the measurement bandwidth, over N number of resource blocks by the UE from all sources, including co-channel serving and non-serving cells, adjacent channel interference, thermal noise. etc.<br>If higher-layer signaling indicates certain subframes for performing RSRQ measurements, then RSSI is measured over all OFDM symbols in the indicated subframes.<br>The reference point for the RSRQ shall be the antenna connector of the UE.<br>If receiver diversity is in use by the UE, the reported value shall not be lower than the corresponding RSRQ of any of the individual diversity branches. |
| Applicable for | RRC_IDLE intra-frequency,<br>RRC_IDLE inter-frequency,<br>RRC_CONNECTED intra-frequency,<br>RRC_CONNECTED inter-frequency. |

It is noted that the subject matter of this disclosure can be used to enhance cell detection, load shifting between cells, on/off operation, and dual connectivity for Secondary eNB (SeNB)/SCell activation/deactivation on both licensed and unlicensed spectrum.

In One Embodiment (Embodiment 1—D-RSRP, D-RSSI and D-RSRQ Definitions)

As mentioned previously, RSRP is a key measurement which allows direct measurement of the reference signals transmitted by a serving cell or a neighboring cell, giving an indication of the signal strength at the measuring UE. When considering the introduction of a new DRS, RSRP measurement based on the configured DRS should also be supported. The RSRP measurement should be performed by the UE on the OFDM symbols carrying the configured discovery reference signals. Examples of description of the DRS-based RSRP are given below:

Example 1

| | |
|---|---|
| Definition | Discovery reference signal received power (D-RSRP), is defined as the linear average over the power contributions (in Watts [W]) of the resource elements that carry discovery reference signals within the considered measurement frequency bandwidth according to the discovery signal measurement configuration provided to the UE and as defined in TS 36.311 [REF7].<br>For D-RSRP determination the discovery reference signals according TS 36.211 [REF3] shall be used.<br>The reference point for the D-RSRP shall be the antenna connector of the UE.<br>If receiver diversity is in use by the UE, the reported value shall not be lower than the corresponding D-RSRP of any of the individual diversity branches. |
| Applicable for | RRC_IDLE intra-frequency,<br>RRC_IDLE inter-frequency,<br>RRC_CONNECTED intra-frequency,<br>RRC_CONNECTED inter-frequency. |

Example 2

| | |
|---|---|
| Definition | Discovery reference signal received power (D-RSRP), is defined as the linear average over the power contributions (in Watts [W]) of the resource elements that carry discovery reference signals within the considered measurement frequency bandwidth.<br>For D-RSRP determination the discovery reference signals according TS 36.211 [REF3] shall be used.<br>The reference point for the DS-RSRP shall be the antenna connector of the UE.<br>If receiver diversity is in use by the UE, the reported value shall not be lower than the corresponding D-RSRP of any of the individual diversity branches. |
| Applicable for | RRC_IDLE intra-frequency,<br>RRC_IDLE inter-frequency,<br>RRC_CONNECTED intra-frequency,<br>RRC_CONNECTED inter-frequency |

Additionally, RSRQ measurement based on the discovery reference signal is useful for the network in determining the current relative suitability of a measured cell depending on load and on/off status of the serving and neighboring cells. In one alternative the D-RSRQ can be defined as the following, where the D-RSSI measurement includes all the Orthogonal Frequency Division Multiplexing (OFDM) symbols within the configured measurement bandwidth, but excludes OFDM symbols containing or potentially containing the discovery reference signals of cells, including the target cell on which the RSRP is measured. OFDM symbols containing or potentially containing the discovery reference signals of cells can be either predefined, or configured by the eNodeB. The above definition is beneficial to avoid ambiguity about the on/off status of the cells at the time of measurement. If the UE measures the resource elements (REs) containing DRS transmitted by cells in the off state, the D-RSRQ may overestimate the strength of the potential interference experienced by a UE upon association with the candidate cell as the off-state cell will only contribute to interference during DRS transmission. The issue of interference overestimation may be further exacerbated if the DRS are power boosted by cells. A variation to this definition is D-RSSI measurement includes all the OFDM symbols within the configured measurement bandwidth, but excludes resource elements containing or potentially containing the discovery reference signals of cells, i.e., the resource elements in an OFDM symbol containing the discovery reference signals that are not assigned or reserved for discovery reference signals can still be used for D-RSSI measurement. Another variation of this definition is that the D-RSSI measurement includes all the OFDM symbols within the configured measurement bandwidth, but excludes a subset of OFDM symbols containing or potentially containing the discovery reference signals of cells.

Figure 4:
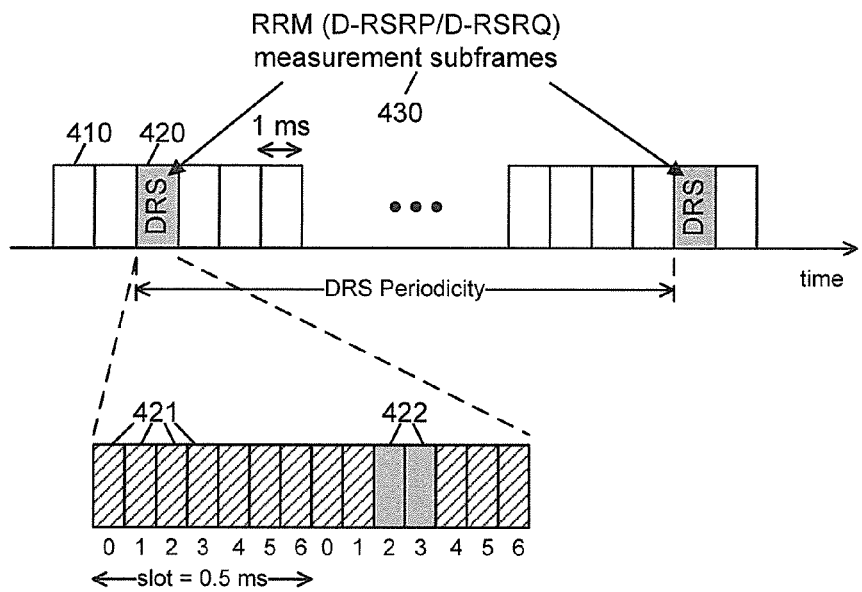
FIG. 4 illustrates a first alternative for D-RSRP/D-RSRQ measurement in accordance with embodiments of the present disclosure.

Referring to FIG. 4, within a set of subframes 410, a UE measures D-RSRP/D-RSRQ using a group 430 of subframes in which DRS are transmitted. In a DRS subframe 420, D-RSRP is measured in OFDM symbols 422 containing DRS resource elements, whereas D-RSSI is measured in OFDM symbols 421 not containing DRS resource elements. D-RSRQ is constructed as the ratio N×D-RSRP/D-RSSI, where N is the number of RBs of the D-RSSI measurement bandwidth.

Examples of this definition (Definition 1) of D-RSRQ are given below:

Example 1 of Definition 1

| | |
|---|---|
| Definition | Discovery Reference Signal Received Quality (D-RSRQ) is defined as the ratio N × D-RSRP/(E-UTRA carrier D-RSSI), where N is the number of RBs of the D-RSSI measurement bandwidth. The measurements in the numerator and denominator shall be made over the same set of resource blocks.<br>Discovery Received Signal Strength Indicator (D-RSSI), comprises the linear average of the total received power (in Watts [W]) observed only in OFDM symbols not containing discovery signal resource elements, in the measurement bandwidth, over N number of resource blocks by the UE from all sources, including co-channel serving and non-serving cells, adjacent channel interference, thermal noise, etc.<br>The reference point for the D-RSRQ shall be the antenna connector of the UE.<br>If receiver diversity is in use by the UE, the reported value shall not be lower than the corresponding D-RSRQ of any of the individual diversity branches. |
| Applicable for | RRC_IDLE intra-frequency,<br>RRC_IDLE inter-frequency,<br>RRC_CONNECTED intra-frequency,<br>RRC_CONNECTED inter-frequency. |

Example 2 of Definition 1

| | |
|---|---|
| Definition | Discovery Reference Signal Received Quality (D-RSRQ) is defined as the ratio N × D-RSRP/(E-UTRA carrier D-RSSI), where N is the number of RBs of the D-RSSI measurement bandwidth. The measurements in the numerator and denominator shall be made over the same set of resource blocks.<br>Discovery Received Signal Strength Indicator (D-RSSI), comprises the linear average of the total received power (in Watts [W]) observed only in OFDM symbols not containing discovery reference symbols, in the measurement bandwidth, over N number of resource blocks by the UE from all sources, including co-channel serving and non-serving cells, adjacent channel interference, thermal noise, etc.<br>The reference point for the D-RSRQ shall be the antenna connector of the UE.<br>If receiver diversity is in use by the UE, the reported value shall not be lower than the corresponding D-RSRQ of any of the individual diversity branches. |
| Applicable for | RRC_IDLE intra-frequency,<br>RRC_IDLE inter-frequency,<br>RRC_CONNECTED intra-frequency,<br>RRC_CONNECTED inter-frequency. |

In one example, the DRS subframes of cells/transmission points of a frequency can contain CRS (e.g., port 0) and CSI-RS, the D-RSSI measurement can include all the OFDM symbols within the configured measurement bandwidth, but excludes OFDM symbols containing or potentially containing the CSI-RS of the DRS subframes, including the target cell/transmission point on which the RSRP is measured. OFDM symbols containing or potentially containing the CSI-RS of cells/transmission point can be either predefined, or configured by the eNodeB (e.g., by configuring CSI-RS subframe configuration, RE configuration (or CSI-RS configuration index), CSI-RS subframe offset with respect to the SSS subframe (subframe containing SSS). In this example, even though the CRS is present and is part of the discovery reference signals (e.g., in symbol index 0 and 4 of each slot of DRS subframe (421 of FIG. 4), for non-MBSFN subframe, and in symbol index 0 of the first slot of DRS subframe for MBSFN subframe), OFDM symbols containing the CRS is also measured for D-RSSI (i.e., the energy of the CRS is included in the D-RSSI measurement). Including the CRS of DRS in the D-RSSI measurement but excluding the CSI-RS of DRS in the D-RSSI measurement avoids potential overestimation of D-RSSI as a result of CSI-RS (e.g., when signals from a large number of CSI-RS ports are present) and still take the energy of the CRS into account in the D-RSSI as in the legacy measurement behavior. For a subframe that contains also PSS and/or SSS as part of the DRS, the symbols that contain PSS and SSS can also be excluded from the D-RSSI measurement since they may contribute to D-RSSI overestimation significantly. Alternatively, the symbols that contain PSS and SSS can be included in the D-RSSI measurement as in the legacy measurement behavior.

The above definition can be extended in a straightforward manner to the case where D-RSSI is measured over multiple subframes (which may include subframes that do not contain the DRS) while D-RSRP is still measured in subframes that contain the DRS.

In a second alternative, the D-RSRQ can be defined as the following, where the D-RSSI measurement includes all the OFDM symbols within the configured measurement bandwidth including the symbols containing the discovery reference signals. The advantage of this alternative is that the energy of the discovery reference signals from cells is also taken into account in D-RSSI measurement. Since only a fraction of OFDM symbols are allocated to discovery reference signals, the D-RSSI can still reflect the load situation of the carrier frequency concerned.

Figure 5:
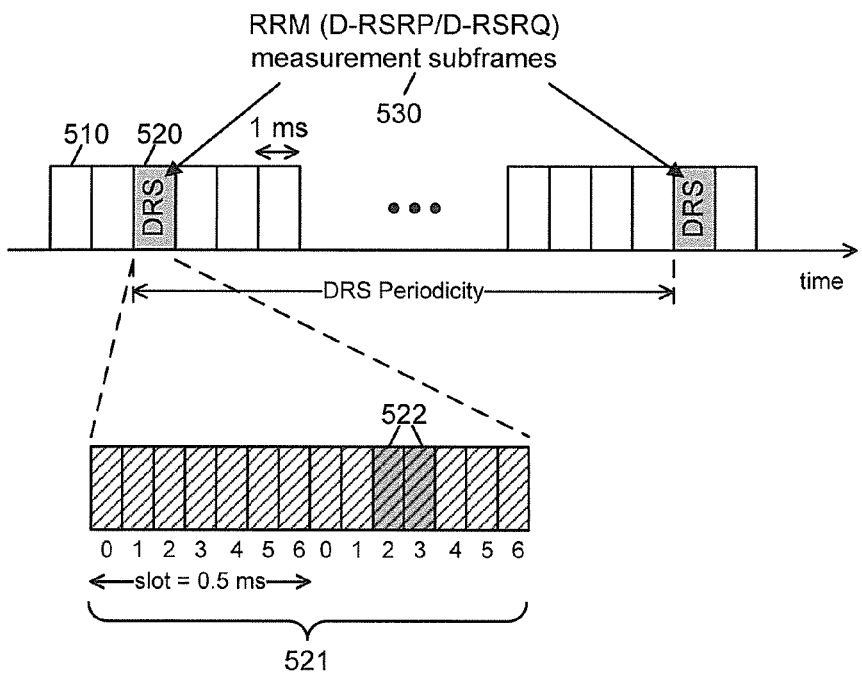
FIG. 5 illustrates a second alternative for D-RSRP/D-RSRQ measurement in accordance with embodiments of the present disclosure.

Referring to FIG. 5, a UE measures D-RSRP/D-RSRQ in a set of subframes 530 where DRS are transmitted. In a DRS subframe 520, D-RSRP is measured in OFDM symbols 522 containing DRS resource elements, whereas D-RSSI is measured in all OFDM symbols 521 in subframes containing the DRS. D-RSRQ is constructed as the ratio N×D-RSRP/D-RSSI, where N is the number of RBs of the D-RSSI measurement bandwidth.

Example 1 of this definition (Definition 2) of D-RSRQ is given below:

| | |
|---|---|
| Definition | Discovery Reference Signal Received Quality (D-RSRQ) is defined as the ratio N × RSRP/(E-UTRA carrier D-RSSI), where N is the number of RB's of the D-RSSI measurement bandwidth. The measurements in the numerator and denominator shall be made over the same set of resource blocks. Discovery Received Signal Strength Indicator (D-RSSI), comprises the linear average of the total received power (in Watts [W]) observed in all OFDM symbols in the measurement bandwidth, over N number of resource blocks by the UE from all sources, including co-channel serving and non-serving cells, adjacent channel interference, thermal noise, etc. The reference point for the D-RSRQ shall be the antenna connector of the UE. If receiver diversity is in use by the UE, the reported value shall not be lower than the corresponding D-RSRQ of any of the individual diversity branches. |
| Applicable for | RRC_IDLE intra-frequency, RRC_IDLE inter-frequency, RRC_CONNECTED intra-frequency, RRC_CONNECTED inter-frequency. |

Example 2 of this definition (Definition 2) of D-RSRQ is given below:

| | |
|---|---|
| Definition | Discovery Reference Signal Received Quality (D-RSRQ) is defined as the ratio N × RSRP/(E-UTRA carrier D-RSSI), where N is the number of RB's of the D-RSSI measurement bandwidth. The measurements in the numerator and denominator shall be made over the same set of resource blocks. Discovery Received Signal Strength Indicator (D-RSSI), comprises the linear average of the total received power (in Watts [W]) observed in all OFDM symbols in the measurement bandwidth of subframes containing DRS, over N number of resource blocks by the UE from all sources, including co-channel serving and non-serving cells, adjacent channel interference, thermal noise etc. The reference point for the D-RSRQ shall be the antenna connector of the UE. If receiver diversity is in use by the UE, the reported value shall not be lower than the corresponding D-RSRQ of any of the individual diversity branches. |

The above definition can be extended in a straightforward manner to the case where D-RSSI is measured over multiple subframes, such as over the entire DMTC (which may include subframes that do not contain the DRS), while D-RSRP is still measured in subframes that contain the DRS.

In a third alternative, the D-RSRQ can be defined as the following, where the D-RSSI is a function of two measurement components. A first component is the D-RSRP or a×D-RSRP, where a is a predefined or configurable constant. In one example, a is the number REs occupied by the DRS measured for D-RSRP within the measurement bandwidth N. A second component is the measurement that includes all the OFDM symbols within the configured measurement bandwidth, but excludes OFDM symbols containing or potentially containing the discovery reference signals of cells, e.g., as in the previously described D-RSSI Definition 1. In a first example, the D-RSSI is a sum of the first and the second component, i.e., D-RSSI of the third alternative=D-RSSI according to Definition 1+a×D-RSRP. An advantage of this alternative is that the definition or physical meaning of D-RSRQ (=N×D-RSRP/D-RSSI) would be more compatible with the definition or physical meaning of the legacy RSRQ and as a result, the D-RSRQ range can be similar to the RSRQ range that is defined for reporting in Rel-11. It also allows simple comparison of RSRQ and D-RSRQ by the eNodeB. In a second example, the D-RSSI is an average of the first and the second component, i.e., D-RSRQ=N×D-RSRP/Average(D-RSSI according to Definition 1+a×D-RSRP).

Referring again to FIG. 4, a UE measures D-RSRP/D-RSRQ in a set of subframes 430 where DRS are transmitted. In a DRS subframe 420, D-RSRP is measured in OFDM symbols 422 containing DRS resource elements, whereas D-RSSI is generated by combining a first component which is the D-RSRP or a×D-RSRP measured in OFDM symbols 422 containing DRS resource elements and the second component which is OFDM symbols 421 not containing DRS resource elements. D-RSRQ is constructed as the ratio N×D-RSRP/D-RSSI, where N is the number of RBs of the D-RSSI measurement bandwidth.

Additionally, for the above alternatives, if higher-layer signaling indicates certain subframes for performing D-RSRQ measurements, then D-RSSI is measured over all OFDM symbols in the indicated subframes. Alternatively, especially in the case of Definition 1, if higher-layer signaling indicates certain subframes for performing RSRQ measurements, then RSSI is measured over all OFDM symbols in the indicated subframes, but excluding resource elements or symbols containing discovery reference signals.

In One Embodiment (Embodiment 2—Measurement Reporting Configuration)

A network can configure a UE to measure RRM RS from multiple cells to generate a signal quality measurement such as RSRP and/or RSRQ and/or SINR of each cell. For a small cell deployment scenario, the cells to be measured by the UE can be from a same cluster of small cells or can be from multiple clusters of small cells. A UE reports measurement results to a network when a reporting criterion is met, e.g., measurement reporting can be triggered when a RSRP/RSRQ value is greater than a threshold that can be configured by the network. If a UE does not have a PUSCH transmission, it can transmit a service request in a PUCCH to request scheduling from a network for a PUSCH transmission in order to report measurement results. Alternatively, a UE can be configured by a network a PUCCH resource or a PUSCH resource to use for reporting measurement results. That resource is valid only for a subframe occurring after subframe(s) of transmissions of RRM RS and therefore an associated overhead for reporting measurement results is low.

If a UE supports DRS based RRM measurement, the UE can be configured with a DRS based measurement report configuration. The UE should also support CRS based measurement according to the legacy methods. There is a need to specify how the UE shall distinguish the measurement reference signal type associated with a reporting configuration.

In addition, it is beneficial to enable a CRS-based measurement to be compared with a DRS-based measurement for measurement events such as Event A3, A5 and A6 [REF7]. This is because a first cell may only transmit a first measurement reference signal or the UE may only detect the first measurement reference signal from the first cell; whereas a second cell may only transmit a second measurement reference signal or the UE may only detect the second measurement reference signal form the second cell. For example, the measurement reference signal for the PCell or the UE's serving cell is the CRS whereas the measurement reference signal for another cell (on the same or different carrier frequency) is the DRS. Event A3 can be triggered based on CRS measurement of the PCell and DRS measurement of the other cell.

Measurement restriction can be introduced such that only CRS based measurement is required for PCell measurement or that only CRS based measurement is required for the serving cell. Depending on the measurement restriction, certain measurement events are not relevant for the UE, e.g., Event A1 and A2 are not relevant for DRS based measurement if only CRS based measurement is required for serving cells (which include the PCell and SCell(s)). UE also does not measure PCell measurement based on DRS for Event A3 or A5 if only CRS based measurement is required for PCell. Such restrictions are beneficial for implementation simplicity without compromising performance loss if CRS is assumed always transmitted for serving cells or PCell. In the following methods described in this embodiment, no specific assumptions are made about relevance of measurement events for DRS based measurement.

In one method (Method 1) of measurement reporting configuration for DRS-based measurements, the RRC report configuration for CRS based RRM measurement is also applicable for DRS based RRM measurement. The existing report configuration message can be extended to contain new field(s) relevant for DRS based measurement, e.g., measurement period configuration that dictates the L1 measurement period for DRS based measurement.

This is beneficial for the network to reuse existing triggering criterion configurations while at the same time supporting both legacy and DRS-based measurement reports. For example, the measurement reports based on existing signals may be made and on different subframe and with different periodicities than those based on a DRS, and the network can utilize both types of reports to obtain a more comprehensive assessment of the interference and load situation observed by the UE as influenced by on/off transitions, load shifting, and mobility.

In addition, comparison between a CRS-based measurement and a DRS-based measurement through measurement events such as Event A3, A5 and A6 [REF7] and other potentially new events can also be supported.

Since the legacy RRC report configuration is reused, there is a need for the UE to include in its measurement result message the corresponding measurement reference signal type. Methods to achieve this are further described in Embodiment 3. The UE may recognize that DRS based measurement results are needed based on configuration in the measurement object (measObjectEUTRA) that indicates DRS measurement configuration information or through configuration in the reporting configuration message that is only relevant for DRS based measurement.

Figure 6:
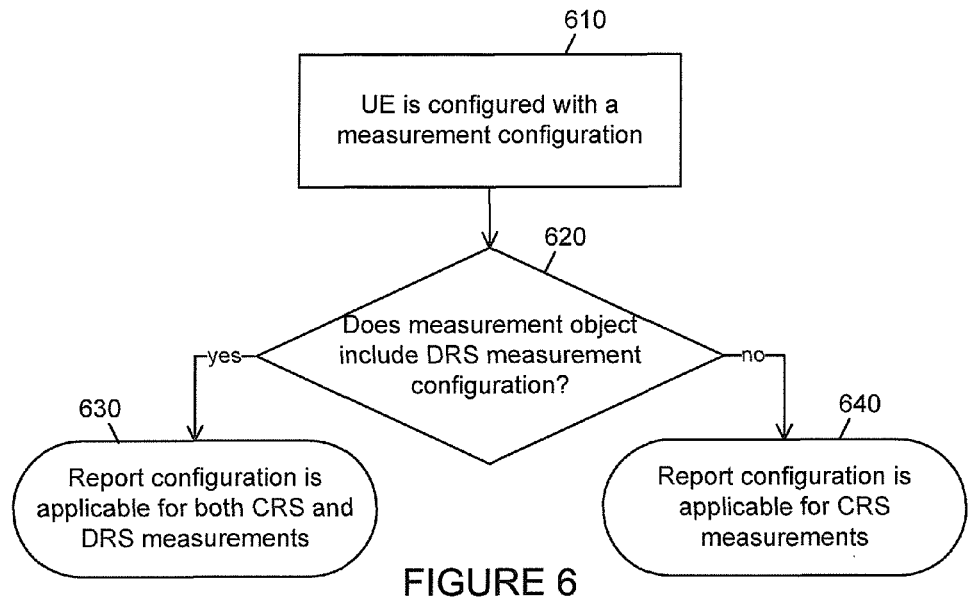
FIG. 6 is a high level flow diagram for one exemplary UE procedure for configuring D-RSRP/D-RSRQ measurement reports in accordance with embodiments of the present disclosure.

An example UE procedure for Method 1 is illustrated in FIG. 6. Referring to FIG. 6, a UE is configured with a measurement configuration (step 610). If the measurement object associated with the measurement configuration includes a DRS measurement configuration (step 620), then the corresponding reporting configuration is assumed to be applicable for CRS and DRS measurement (step 630). Otherwise the reporting configuration is assumed to be applicable for CRS measurement (only) (step 640).

In one method (Method 2) of measurement reporting configuration for DRS-based measurements, a measurement report configuration for RRM measurement based on DRS can also be configured to a UE as a separate RRC report configuration message (ReportConfigEUTRA [REF7]) with a separate report configuration id (ReportConfigId [REF7]). The fields in ReportConfigEUTRA can be reinterpreted to be for DRS based measurement. This approach allows independent reporting configuration for DRS based measurement, and hence provides more flexibility for the network to control UE reporting.

In one option, there is only one measurement reference signal type associated with a RRC report configuration, e.g., events that compare a CRS based measurement to a DRS based measurement and vice versa are not supported. In another option, the combination of measurement reference signal types to be used for measurement events that compare measurements of two cells (such as A3, A5, A6) can be indicated to the UE. In another option, the UE assumes that mixed measurement reference signal types for events that compare measurements of two cells (such as A3, A5, A6) are possible. In the following examples of measurement reporting configuration, all three options of UE reporting are possible. For simplicity, the following examples are described for the first option only. The details of the signaling method to realize the second option are omitted. Extension to the third option can be accomplished, e.g., by allowing comparison of a CRS based measurement and a DRS based measurement for Events A3, A5 and A6 (and potentially other new events comparing two or more measurements). For the third option, there may be a need for the UE to include in its measurement result message the corresponding measurement reference signal types used. Methods to achieve this are further described in Embodiment 3.

There is a need to indicate to the UE that the report configuration message corresponds to DRS based measurement instead of the conventional CRS based measurement.

In a first example of measurement reference signal type indication in RRC report configuration message, a new version of information element ReportConfigEUTRA is defined to indicate that the configuration is associated with DRS based measurement. The report configuration message can also contain new field(s) relevant for DRS based measurement, e.g., measurement period configuration that dictates the L1 measurement period for DRS based measurement. An example UE procedure is illustrated in FIG. 7.

Figure 7:
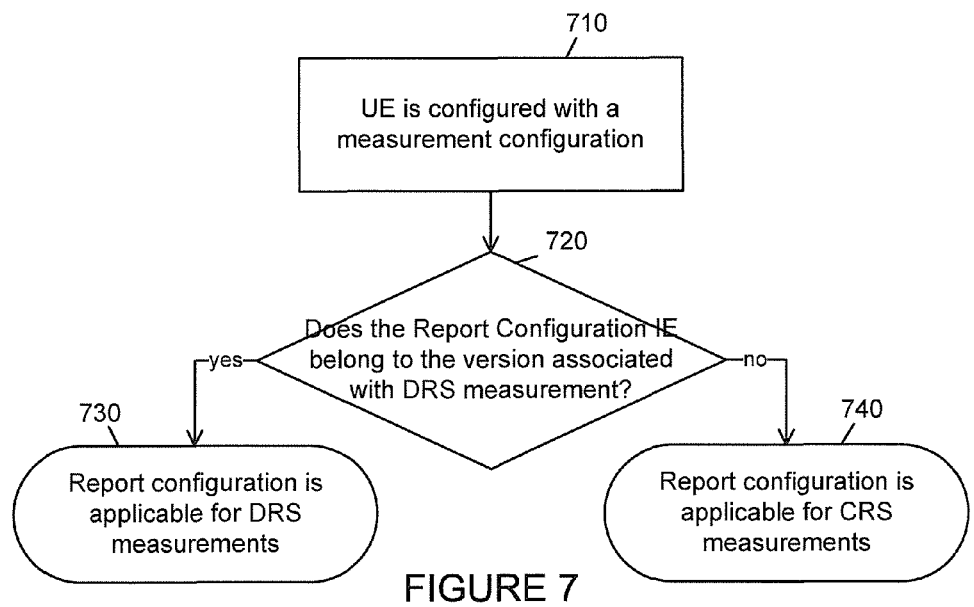
FIG. 7 is a high level flow diagram for one example of an alternative UE procedure for configuring D-RSRP/D-RSRQ measurement reports in accordance with embodiments of the present disclosure.

Referring to FIG. 7, a UE is configured with a measurement configuration (step 710). If the Report Configuration Information Element (IE) is associated with DRS measurement (step 720), then the corresponding reporting configuration is assumed to be applicable for DRS measurement (step 730). Otherwise the reporting configuration is assumed to be applicable for CRS measurement (step 740).

An example ASN.1 code for a report configuration procedure of FIG. 7 is given below:

In a second example of measurement reference signal type indication in RRC report configuration message, a field indicating the measurement reference signal type is included in the legacy information element ReportConfigEUTRA

```
-- ASN1START
ReportConfigEUTRA-vxy ::=     SEQUENCE {
    triggerType                                     CHOICE {
        event                                       SEQUENCE {
            eventId                                 CHOICE {
                eventA1
                    SEQUENCE {
                        a1-Threshold
                            ThresholdEUTRA
                    },
                eventA2
                    SEQUENCE {
                        a2-Threshold
                            ThresholdEUTRA
                    },
                eventA3
                    SEQUENCE {
                        a3-Offset
                            INTEGER (-30..30),
                        reportOnLeave
                            BOOLEAN
                    },
                eventA4
                    SEQUENCE {
                        a4-Threshold
                            ThresholdEUTRA
                    },
                eventA5
                    SEQUENCE {
                        a5-Threshold1
                            ThresholdEUTRA,
                        a5-Threshold2
                            ThresholdEUTRA
                    },
                ...,
                eventA6-r10                         SEQUENCE {
                    a6-Offset-r10
                        INTEGER (-30..30),
                    a6-ReportOnLeave-r10            BOOLEAN
                }
            },
            hysteresis                              Hysteresis,
            timeToTrigger                           TimeToTrigger
        },
        periodical                                  SEQUENCE {
            purpose
                ENUMERATED {
                    reportStrongestCells, reportCGI}
        }
    },
    triggerQuantity                                 ENUMERATED {rsrp, rsrq},
    reportQuantity                                  ENUMERATED
        {sameAsTriggerQuantity, both},
    maxReportCells                                  INTEGER (1..maxCellReport),
    reportInterval                                  ReportInterval,
    reportAmount                                    ENUMERATED
        {r1,r2,r4,r8,r16,r32,r64,infinity},
    ...,
    [[  si-RequestForHO-r9        ENUMERATED  {setup}  OPTIONAL,-- Cond reportCGI
        ue-RxTxTimeDiffPeriodical-r9    ENUMERATED  {setup}  OPTIONAL -- Need OR
    ]],
    [[  includeLocationInfo-r10           ENUMERATED       {true}
            OPTIONAL, -- Need OR
        reportAddNeighMeas-r10            ENUMERATED       {setup}
            OPTIONAL -- Need OR
    ]],
    [[  measPeriodConfig-vxy        MeasPeriodConfig OPTIONAL -- Need ON
    ]]
}
-- ASN1STOP
```

[REF7]. The measurement reference signal type indication can be achieved by introducing a new one-bit field, e.g., discoveryReferenceSignal. In another method, the measurement reference signal type indication can also be achieved by the UE recognizing the presence of field(s) that is(are) only relevant for DRS based measurement, e.g., measPeriodConfig. An example UE procedure is illustrated in FIG. 8.

Figure 8:
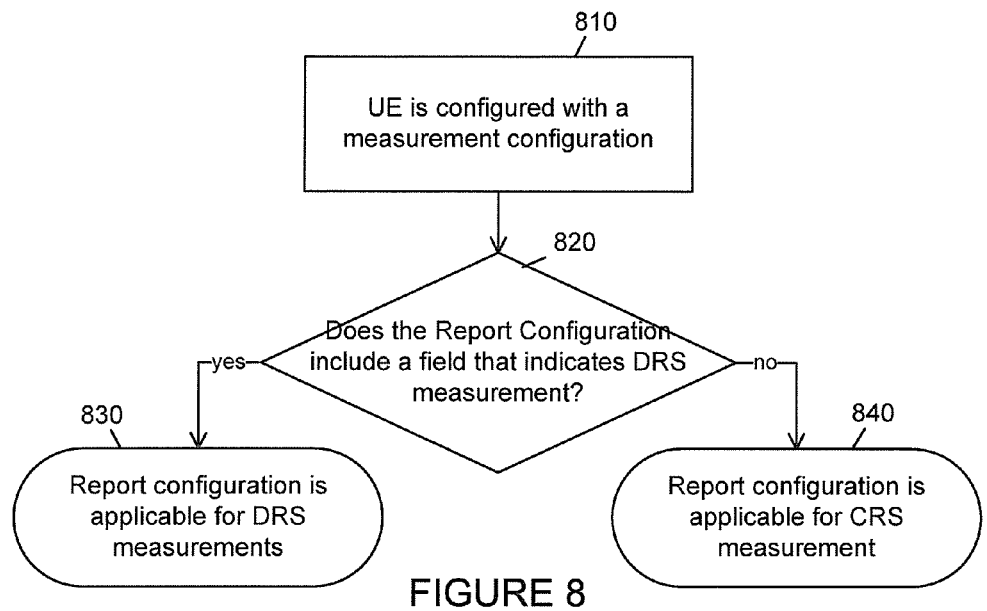
FIG. 8 is a high level flow diagram for another example of an alternative UE procedure for configuring D-RSRP/D-RSRQ measurement reports in accordance with embodiments of the present disclosure.

Referring to FIG. 8, a UE is configured with a measurement configuration (step 810). If the Report Configuration includes a field that indicates DRS measurement (step 820), then the corresponding reporting configuration is assumed to be applicable for DRS measurement (step 830). Otherwise the reporting configuration is assumed to be applicable for CRS measurement (step 840).

An example ASN.1 code for a report configuration procedure of FIG. 8 is given below:

```
-- ASN1START
ReportConfigEUTRA ::=              SEQUENCE {
    triggerType                         CHOICE {
        event                               SEQUENCE {
            eventId                             CHOICE {
                eventA1
                    SEQUENCE {
                        a1-Threshold                    ThresholdEUTRA
                    },
                eventA2
                    SEQUENCE {
                        a2-Threshold                    ThresholdEUTRA
                    },
                eventA3
                    SEQUENCE {
                        a3-Offset                       INTEGER (-30..30),
                        reportOnLeave                   BOOLEAN
                    },
                eventA4
                    SEQUENCE {
                        a4-Threshold                    ThresholdEUTRA
                    },
                eventA5
                    SEQUENCE {
                        a5-Threshold1                   ThresholdEUTRA,
                        a5-Threshold2                   ThresholdEUTRA
                    },
                ...,
                eventA6-r10                     SEQUENCE {
                    a6-Offset-r10                   INTEGER (-30..30),
                    a6-ReportOnLeave-r10            BOOLEAN
                }
            },
            hysteresis                      Hysteresis,
            timeToTrigger                   TimeToTrigger
        },
        periodical                          SEQUENCE {
            purpose
                ENUMERATED {
                    reportStrongestCells, reportCGI}
            }
    },
    triggerQuantity                     ENUMERATED {rsrp, rsrq},
    reportQuantity                      ENUMERATED {sameAsTriggerQuantity, both},
    maxReportCells                      INTEGER (1..maxCellReport),
    reportInterval                      ReportInterval,
    reportAmount                        ENUMERATED {r1,r2,r4,r8,r16,r32,r64, infinity},
    ...,
    [[ si-RequestForHO-r9              ENUMERATED{setup} OPTIONAL, -- Cond reportCGI
        ue-RxTxTimeDiffPeriodical-r9   ENUMERATED {setup} OPTIONAL -- Need OR
    ]],
    [[ includeLocationInfo-r10         ENUMERATED {true}OPTIONAL,-- Need OR
        reportAddNeighMeas-r10         ENUMERATED {setup} OPTIONAL -- Need OR
    ]],
```

```
 [[ discoveryReferenceSignal-rxy ENUMERATED (setup) OPTIONAL, -- Need ON
measPeriodConfig-vxy         MeasPeriodConfig OPTIONAL -- Need ON
 ]]
}
ThresholdEUTRA ::=     CHOICE{
   threshold-RSRP               RSRP-Range,
   threshold-RSRQ               RSRQ-Range
-- ASN1STOP
```

In a third example, the UE may be configured with a new measurement trigger type or event. The new measurement trigger type or event is used by the UE to determine the measurement reference signal type. For example, new fields for Event A1, A2, A3, A4, A5 and A6 corresponding to DRS based measurement can be introduced. An example UE procedure is illustrated in FIG. 9.

Figure 9:
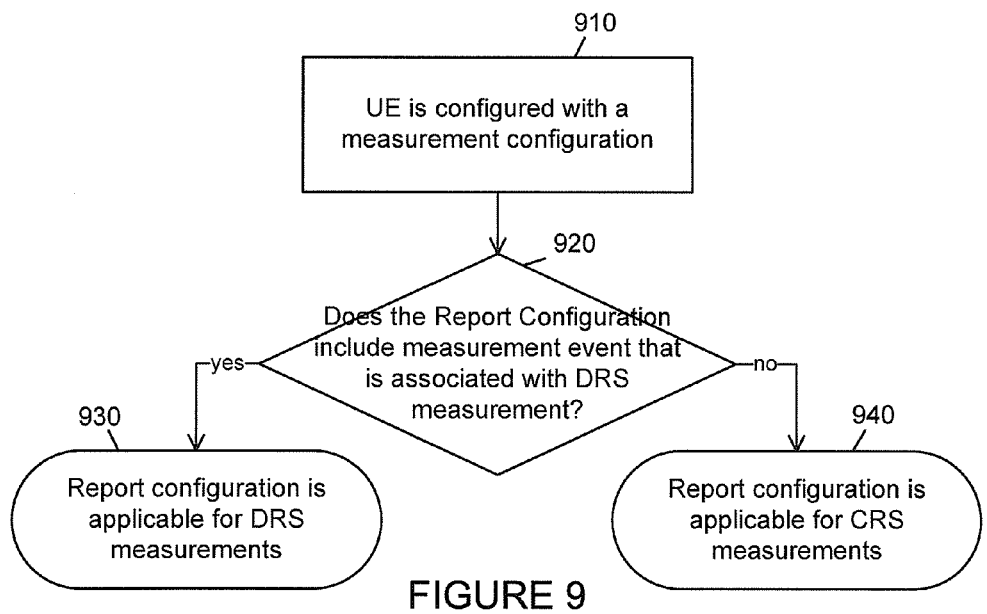
FIG. 9 is a high level flow diagram for a third example of an alternative UE procedure for configuring D-RSRP/D-RSRQ measurement reports in accordance with embodiments of the present disclosure.

Referring to FIG. 9, a UE is configured with a measurement configuration (step 910). If the Report Configuration includes a measurement event that is associated with DRS measurement (step 920), then the corresponding reporting configuration is assumed to be applicable for DRS measurement (step 930). Otherwise the reporting configuration is assumed to be applicable for CRS measurement (step 940).

An example ASN.1 code for a report configuration procedure of FIG. 9 is given below:

```
-- ASN1START
ReportConfigEUTRA ::=    SEQUENCE {
    triggerType                          CHOICE {
       event                                   SEQUENCE {
          eventId                                        CHOICE
{
             eventA1
SEQUENCE {
                a1-Threshold
ThresholdEUTRA
             },
             eventA2
SEQUENCE {
                a2-Threshold
ThresholdEUTRA
             },
             eventA3
SEQUENCE {
                a3-Offset
INTEGER (-30..30),
                   reportOnLeave
BOOLEAN
             },
             eventA4
SEQUENCE {
                a4-Threshold
ThresholdEUTRA
             },
             eventA5
SEQUENCE {
                a5-Threshold1
ThresholdEUTRA,
                   a5-Threshold2
ThresholdEUTRA
             },
             ....,
             eventA6-r10
SEQUENCE {
                a6-Offset-r10
INTEGER (-30..30),
                   a6-ReportOnLeave-r10
BOOLEAN
             }
          eventA1-rxy                                  SEQUENCE {
             a1-Threshold
ThresholdEUTRA
          },
          eventA2-rxy
SEQUENCE {
             a2-Threshold
ThresholdEUTRA
          },
          eventA3-rxy
SEQUENCE (
             a3-Offset
```

```
            INTEGER (-30..30),
                    reportOnLeave
            BOOLEAN
            },
                eventA4-rxy
            SEQUENCE {
                    a4-Threshold
            ThresholdEUTRA
            },
                eventA5-rxy
            SEQUENCE {
                    a5-Threshold1
            ThresholdEUTRA,
                    a5-Threshold2
            ThresholdEUTRA
            },
                eventA6-rxy
            SEQUENCE {
                    a6-Offset-r10
            INTEGER (-30..30),
                    a6-ReportOnLeave-r10
            BOOLEAN
                }
            },
            hysteresis                      Hysteresis,
            timeToTrigger                   TimeToTrigger
        },
        periodical                          SEQUENCE {
            purpose
    ENUMERATED {
    reportStrongestCells, reportCGI}
            }
        },
        triggerQuantity                     ENUMERATED {rsrp, rsrq},
        reportQuantity                      ENUMERATED
{sameAsTriggerQuantity, both},
        maxReportCells                      INTEGER
(1..maxCellReport),
        reportInterval                      ReportInterval,
        reportAmount                        ENUMERATED
{r1,r2,r4,r8,r16,r32,r64,infinity},
        ...,
        [[ si-RequestForHO-r9              ENUMERATED    {setup}
OPTIONAL, -- Cond reportCGI
            ue-RxTxTimeDiffPeriodical-r9   ENUMERATED {setup} OPTIONAL --
Need OR
        ]],
        [[ includeLocationInfo-r10         ENUMERATED    {true}
OPTIONAL, -- Need OR
            reportAddNeighMeas-r10         ENUMERATED    {setup}
OPTIONAL -- Need OR
        ]],
        [[ measPeriodConfig-vxy   MeasPeriodConfig OPTIONAL -- Need ON
        ]]
}
ThresholdEUTRA ::=      CHOICE{
    threshold-RSRP              RSRP-Range,
    threshold-RSRQ              RSRQ-Range
}
-- ASN1STOP
```

In a fourth example, new thresholds and offsets associated with the new events can be introduced as well. For example the threshold for triggering an event may be based on whether if it is CRS-based, DRS-based, or a combination in case of event triggers based on comparisons of two measurements. The RSRP and RSRQ ranges may be indicated as well for these new thresholds as they may differ from the RSRP and RSRQ ranges associated with the IE ThresholdEUTRA. For the events based on configured offsets, the range of offsets are indicated to the UE to fall between integers X and Y which may be preconfigured according to the specification or are configured by RRC. An example ASN.1 code for such a procedure is given below:

```
-- ASN1START
ReportConfigEUTRA ::=    SEQUENCE {
    triggerType                         CHOICE {
        event                                       SEQUENCE {
            eventId                                     CHOICE
{
                eventA1
```

```
SEQUENCE {
        a1-Threshold            ThresholdEUTRA
        },
        eventA2
SEQUENCE {
        a2-Threshold            ThresholdEUTRA
        },
        eventA3
SEQUENCE {
        a3-Offset               INTEGER (-30..30),
        reportOnLeave           BOOLEAN
        },
        eventA4
SEQUENCE {
        a4-Threshold            ThresholdEUTRA
        },
        eventA5
SEQUENCE {
        a5-Threshold1           ThresholdEUTRA,
        a5-Threshold2           ThresholdEUTRA
        },
        ...,
        eventA6-r10
SEQUENCE {
        a6-Offset-r10           INTEGER (-30..30),
        a6-ReportOnLeave-r10    BOOLEAN
        }
    eventA1-rxy                 SEQUENCE {
        a1-Threshold-rxy        ThresholdEUTRA-rxy
        },
        eventA2-rxy
SEQUENCE {
        a2-Threshold-rxy        ThresholdEUTRA-rxy
        },
        eventA3-rxy
SEQUENCE {
        a3-Offset               INTEGER (-X..Y),
        reportOnLeave           BOOLEAN
        },
        eventA4-rxy
SEQUENCE {
        a4-Threshold-rxy        ThresholdEUTRA
        },
        eventA5-rxy
SEQUENCE {
        a5-Threshold1-rxy       ThresholdEUTRA-rxy,
        a5-Threshold2-rxy       ThresholdEUTRA-rxy
        },
        eventA6-rxy
SEQUENCE (
        a6-Offset-rxy           INTEGER (-X..Y),
        a6-ReportOnLeave-r10    BOOLEAN
        }
    },
    hysteresis                  Hysteresis,
    timeToTrigger               TimeToTrigger
    },
    periodical                  SEQUENCE {
    purpose
```

```
ENUMERATED {
    reportStrongestCells, reportCGI}
    }
},
    triggerQuantity              ENUMERATED {rsrp, rsrq},
    reportQuantity               ENUMERATED
{sameAsTriggerQuantity, both},
    maxReportCells               INTEGER
(1..maxCellReport),
    reportInterval               ReportInterval,
    reportAmount                 ENUMERATED
{r1,r2,r4,r8,r16,r32,r64,infinity},
    ...,
    [[  si-RequestForHO-r9       ENUMERATED    {setup}
OPTIONAL, -- Cond reportCGI
        ue-RxTxTimeDiffPeriodical-r9  ENUMERATED {setup} OPTIONAL --
Need OR
    ]],
    [[  includeLocationInfo-r10  ENUMERATED    {true}
OPTIONAL, -- Need OR
        reportAddNeighMeas-r10   ENUMERATED    {setup}
OPTIONAL -- Need OR
    ]],
    [[ measPeriodConfig-vxy  MeasPeriodConfig OPTIONAL -- Need ON
    ]]
}
ThresholdEUTRA ::=          CHOICE{
    threshold-RSRP                       RSRP-Range,
    threshold-RSRQ                       RSRQ-Range
}
ThresholdEUTRA-rxy ::=      CHOICE{
    threshold-RSRP-rxy RSRP-             Range-rxy,
    threshold-RSRQ-rxy RSRQ-             Range-rxy
}
-- ASN1STOP
```

Figure 10:
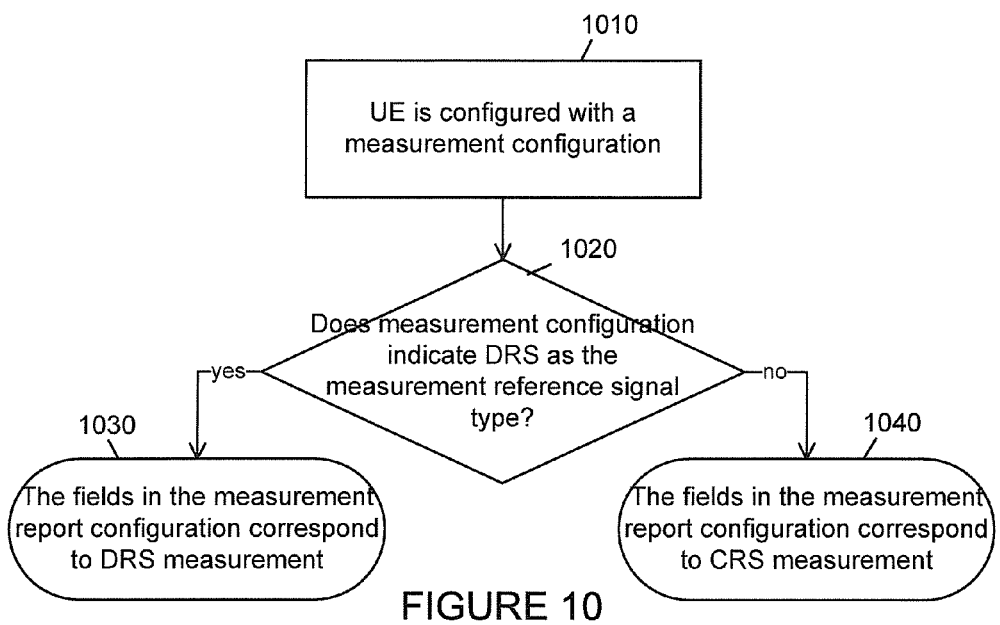
FIG. 10 is a high level flow diagram for a general procedure to determine the measurement reference signal for report configuration in accordance with embodiments of the present disclosure.

An example of a general UE procedure for this embodiment is given in FIG. 10. Referring to FIG. 10, the UE is configured with a RRM measurement configuration via RRC (step 1010). The UE determines from the measurement configuration message the measurement reference signal type (step 1020). If the measurement reference type indicated is DRS, then the UE interprets the fields in the reporting configuration to be for DRS based RRM measurement (step 1030). Otherwise the UE interprets the fields in the reporting configuration to be for CRS based RRM measurement (step 1040).

In One Embodiment (Embodiment 3—UE Measurement Reporting)

As mentioned in Embodiment 2, it is beneficial to enable a CRS-based measurement to be compared with a DRS-based measurement for measurement events such as Event A3, A5 and A6 [REF7]. This is because a first cell may only transmit a first measurement reference signal or the UE may only detect the first measurement reference signal from the first cell, whereas a second cell may only transmit a second measurement reference signal or the UE may only detect the second measurement reference signal form the second cell. For example, the measurement reference signal for the PCell or the UE's serving cell is the CRS whereas the measurement reference signal for another cell (on the same or different carrier frequency) is the DRS. Event A3 can be triggered based on CRS measurement of the PCell and DRS measurement of the other cell.

The UE may be configured to report the measurement reference signal type in a RRM measurement result to distinguish whether a legacy RSRP/RSRQ or D-RSRP/D-RSRQ is being reported by the UE. In other words, the network can configure the UE to indicate in a RRM measurement result/report whether the corresponding RSRP/ RSRQ measurement result was generated based on CRS or DRS. For example, if a measurement event that concerns only one cell such as A1, A2, A4 [as defined in Sec 5.5.4 of 3GPP TS 36.331] is triggered, the UE shall include in the measurement report the measurement reference signal type that triggers the measurement event. If a measurement event that concerns comparison of two cells, such as A3, A5 and A6 [as defined in Sec 5.5.4 of 3GPP TS 36.331] is triggered, the UE shall include in the measurement report the combination of measurement reference signal types that triggers the measurement event.

In addition, measurement restriction can be introduced such that only CRS based measurement is required for PCell measurement or that only CRS based measurement is required for the serving cell. Depending on the measurement restriction, certain measurement events are not relevant for the UE, e.g., Event A1 and A2 are not relevant for DRS based measurement if only CRS based measurement is required for serving cells (which include the PCell and SCell(s)). UE also does not measure PCell measurement based on DRS for Event A3 or A5 if only CRS based measurement is required for PCell. Such restrictions are beneficial for implementation and testing simplicity without compromising performance loss if CRS is assumed always transmitted for serving cells or PCell.

In one method (Method 1) of measurement reporting, the PCell measurement is only based on the CRS, and neighboring cells measurement as well as SCells measurement can be based on CRS or DRS. An indication can be included in the measurement result of the neighboring cell and the SCell regarding the type of measurement reference signal, respectively. An example ASN.1 code for such measurement reporting is given below:

MeasResults Information Element

```
-- ASN1START
MeasResults ::=                         SEQUENCE {
    measId                              MeasId,
    measResultPCell                     SEQUENCE {
        rsrpResult                      RSRP-Range,
        rsrgResult                      RSRQ-Range
    },
    measResultNeighCells                CHOICE {
        measResultListEUTRA             MeasResultListEUTRA,
        measResultListUTRA              MeasResultListUTRA,
        measResultListGERAN             MeasResultListGERAN,
        measResultsCDMA2000             MeasResultsCDMA2000,
        ...
    }
    ...,                                OPTIONAL,
    [[ measResultForECID-r9             MeasResultForECID-r9
    OPTIONAL
    ]],
    [[ locationInfo-r10                 LocationInfo-r10
        OPTIONAL,
       measResultServFregList-r10       MeasResultServFreqList-r10
    OPTIONAL
    ]]
}
MeasResultListEUTRA ::=      SEQUENCE (SIZE (1..maxCellReport)) OF MeasResultEUTRA
MeasResultEUTRA ::= SEQUENCE {
    physCellId                          PhysCellId,
    cgi-Info                            SEQUENCE {
        cellGlobalId                    CellGlobalIdEUTRA,
        trackingAreaCode                TrackingAreaCode,
        plmn-IdentityList               PLMN-IdentityList2
    OPTIONAL
    }
                OPTIONAL,
    measResult                          SEQUENCE {
        rsrpResult                      RSRP-Range
        OPTIONAL,
        rsrgResult                      RSRQ-Range
        OPTIONAL,
        ...,
        [[ additionalSI-Info-r9         AdditionalSI-Info-r9
            OPTIONAL
        ]],
        [[ measReferenceSignalType      ENUMERATED {CRS, DRS} OPTIONAL
        ]]
        Or
        [[ discoveryReferenceSignal     ENUMERATED (true) OPTIONAL
        ]]
    }
}
MeasResultServFreciList-r10 ::= SEQUENCE (SIZE (1..maxServCell-r10)) OF MeasResultServFreq-r10
MeasResultServFreq-r10 ::=              SEQUENCE {
    servFreqId-r10                      ServCellIndex-r10,
    measResultSCell-r10                 SEQUENCE {
        rsrpResultSCell-r10             RSRP-Range,
        rsrqResultSCell-r10             RSRQ-Range
    }
        OPTIONAL,
    measResultBestNeighCell-r10         SEQUENCE {
        physCellId-r10                  PhysCellId,
        rsrpResultNCell-r10             RSRP-Range,
        rsrgResultNCell-r10             RSRQ-Range
    }
        OPTIONAL,
    ...,
    [[ scellMeasReferenceSignalType     ENUMERATED (CRS, DRS) OPTIONAL,
       bestNeighCellMeasReferenceSignalType ENUMERATED (CRS, DRS) OPTIONAL,
    ]]
    Or
    [[ scellDiscoveryReferenceSignal    ENUMERATED (true) OPTIONAL,
       bestNeighCellDiscoveryReferenceSignal ENUMERATED {true} OPTIONAL
    ]]
}
-- ASN1STOP
```

In one method (Method 2) of measurement reporting, indications can be included in the measurement results of PCell, a SCell and a neighboring cell regarding the type of measurement reference signal for the PCell, the SCell and the neighboring cell, respectively. An example ASN.1 code for such measurement reporting is given below:

MeasResults Information Element

```
-- ASN1START
MeasResults ::=                      SEQUENCE {
    measId                               MeasId,
    measResultPCell                      SEQUENCE {
       rsrpResult                           RSRP-Range,
       rsrpResult                           RSRQ-Range
    },
    measResultNeighCells                 CHOICE {
       measResultListEUTRA                  MeasResultListEUTRA,
       measResultListUTRA                   MeasResultListUTRA,
       measResultListGERAN                  MeasResultListGERAN,
       measResultsCDMA2000                  MeasResultsCDMA2000,
       ...
    }
                                         OPTIONAL,
    ...,
    [[ measResultForECID-r9              MeasResultForECID-r9
       OPTIONAL
    ]],
    [[ locationInfo-r10                  LocationInfo-r10
           OPTIONAL,
         measResultServEregList-r10      MeasResultServErecIList-r10
       OPTIONAL
    ]],
    [[ measReferenceSignalType     ENUMERATED (CRS, DRS) OPTIONAL
    ]]
    Or
    [[ discoveryReferenceSignal          ENUMERATED {true} OPTIONAL
    ]]
}
MeasResultListEUTRA ::=               SEQUENCE (SIZE (1..maxCellReport)) OF
MeasResultEUTRA
MeasResultEUTRA ::= SEQUENCE {
    physCellId                           PhysCellId,
    cgi-Info                             SEQUENCE {
       cellGlobalId                         CellGlobalIdEUTRA,
       trackingAreaCode                     TrackingAreaCode,
       plmn-IdentityList                    PLMN-IdentityList2
       OPTIONAL
    }
                                         OPTIONAL,
    measResult                           SEQUENCE {
       rsrpResult                           RSRP-Range
           OPTIONAL,
       rsrqResult                           RSRQ-Range
           OPTIONAL,
       [[ additionalSI-Info-r9              AdditionalSI-Info-
r9     OPTIONAL
       ]],
    [[ measReferenceSignalType           ENUMERATED {CRS, DRS) OPTIONAL
    ]]
    Or
    [[ discoveryReferenceSignal          ENUMERATED {true} OPTIONAL
    ]]
    }
}
MeasResultServFreqList-r10 ::= SEQUENCE (SIZE   (1..maxServCell-r10))   OF
MeasResultServFreq-r10
MeasResultServFreq-r10 ::=      SEQUENCE {
    servFreqId-r10                       ServCellindex-r10,
    measResultSCell-r10                  SEQUENCE {
       rsrpResultSCell-r10                  RSRP-Range,
       rsrgResultSCell-r10                  RSRQ-Range
    }
        OPTIONAL,
    measResultBestNeighCell-r10          SEQUENCE {
       physCellId-r10                       PhysCellId,
       rsrpResultNCell-r10                  RSRP-Range,
       rsrgResultNCell-r10                  RSRQ-Range
    }
        OPTIONAL,
    ...,
    [[ scellMeasReferenceSignalType     ENUMERATED {CRS, DRS} OPTIONAL,
       bestNeighCellMeasReferenceSignalType ENUMERATED {CRS, DRS} OPTIONAL,
    ]]
```

```
Or
[[ scellDiscoveryReferenceSignal      ENUMERATED {true} OPTIONAL,
   bestNeighCellDiscoveryReferenceSignal ENUMERATED {true} OPTIONAL
]]
}
-- ASN1STOP
```

As mentioned in connection with Embodiment 2, new measurement thresholds may be configured for UEs making measurements based on DRS and new ranges of RSRP and RSRQ need to be supported. However if the number of bits required to represent the D-RSRP and D-RSRQ ranges are the same as for RSRP and RSRQ measurements, the corresponding fields in the MeasResult can be reused with an indication in the field description indicating the appropriate description depending on whether a CRS or DRS-based measurement has been indicated by the UE. Example descriptions of rsrpResult and rsrqResult are provided below:

rsrpResult
   If measReferenceSignalType indicates CRS or discoveryReferenceSignal is set to false, rsrpResult corresponds to measured RSRP result of an E UTRA cell. If measReferenceSignalType indicates DRS or discoveryReferenceSignal is set to true rsrpResult corresponds to measured D-RSRP result of an E UTRA cell.

The rsrpResult is only reported if configured by the eNB.

rsrqResult
   If measReferenceSignalType indicates CRS or discoveryReferenceSignal is set to false, rsrpResult corresponds to measured RSRQ result of an E UTRA cell. If measReferenceSignalType indicates DRS or discoveryReferenceSignal is set to true rsrpResult corresponds to measured D-RSRQ result of an E UTRA cell.

The rsrqResult is only reported if configured by the eNB.

In one method (Method 3) of measurement reporting, new measurement thresholds may be configured for UEs making measurements based on DRS and new ranges of RSRP and RSRQ may be supported by introducing a new IE: MeasResults-rxy to differentiate from reports based on legacy configurations. In addition, the DRS may support identification of a larger PCID range than CRS-based measurements, and a new PCID range can be reported in the measurement results. An example ASN.1 code is given below. It should be noted that the IEs measReferenceSignalType and discoveryReferenceSignal may not be needed to be included in the case that MeasResults-rxy is implicitly used by the UE to only report DRS-based measurements.

MeasResults-rxy Information Element

```
-- ASN1START
MeasResults-rxy ::=                        SEQUENCE {
    measId                                     MeasId,
    measResultPCell                            SEQUENCE {
        rsrpResult                                 RSRP-Range-rxy,
        rsrgResult                                 RSRQ-Range-rxy
    },
    measResultNeighCells                       CHOICE {
        measResultListEUTRA                        MeasResultListEUTRA,
        measResultListUTRA                         MeasResultListUTRA,
        measResultListGERAN                        MeasResultListGERAN,
        measResultsCDMA2000                        MeasResultsCDMA2000,
        ...
    }
    ...,                                       OPTIONAL,
    [[ measResultForECID-r9                    MeasResultForECID-r9
       OPTIONAL
    ]],
    [[ locationInfo-r10                        LocationInfo-r10
          OPTIONAL,
       measResultServFreqList-r10              MeasResultServFreqList-r10
       OPTIONAL
    ]],
    [[ measReferenceSignalType  ENUMERATED {CRS, DRS}  OPTIONAL
    ]]
Or
[[discoveryReferenceSignal  ENUMERATED {true}  OPTIONAL
]]
}
MeasResultListEUTRA ::=        SEQUENCE (SIZE (1..maxCellReport)) OF
MeasResultEUTRA
MeasResultEUTRA ::= SEQUENCE {
    physCellId                                 PhysCellId-rxy,
    cgi-Info                                   SEQUENCE {
        cellGlobalId                               CellGlobalIdEUTRA,
        trackingAreaCode                           TrackingAreaCode,
        plmn-IdentityList                          PLMN-IdentityList2
        OPTIONAL
    }
```

```
            OPTIONAL,
        measResult                              SEQUENCE {
            rsrpResult                              RSRP-Range-rxy
                OPTIONAL,
            rsrgResult                              RSRQ-Range-rxy
                OPTIONAL,
            ...,
            [[  additionalSI-Info-r9               AdditionalSI-Info-
r9          OPTIONAL
            ]],
            [[ measReferenceSignalType  ENUMERATED {CRS, DRS}  OPTIONAL
            ]]
            Or
            [[ discoveryReferenceSignal  ENUMERATED (true}  OPTIONAL
            ]]
        }
    }
}
MeasResultServFreqList::= SEQUENCE (SIZE (1..maxServCell-r10)) OF MeasResultServFreq
MeasResultServFreq ::=     SEQUENCE {
        servFreqId-r10                              ServCellIndex-r10,
        measResultSCell                             SEQUENCE {
            rsrpResultSCell                         RSRP-Range-rxy,
            rsrqResultSCell                         RSRQ-Range-rxy
        }
                        OPTIONAL,
        measResultBestNeighCell      SEQUENCE {
            physCellId                              PhysCellId-rxy,
            rsrpResultNCell                         RSRP-Range-rxy,
            rsrqResultNCell                         RSRQ-Range-rxy
        }
                        OPTIONAL,
        ...,
        [[ scellMeasReferenceSignalType   ENUMERATED (CRS, DRS) OPTIONAL,
           bestNeighCellMeasReferenceSignalType   ENUMERATED (CRS, DRS) OPTIONAL,
        ]]
        Or
        [[ scellDiscoveryReferenceSignal   ENUMERATED (true) OPTIONAL,
           bestNeighCellDiscoveryReferenceSignal   ENUMERATED (true) OPTIONAL
        ]]
}
-- ASN1STOP
```

In One Embodiment (Embodiment 3—Measurement Construction)

Figure 11:
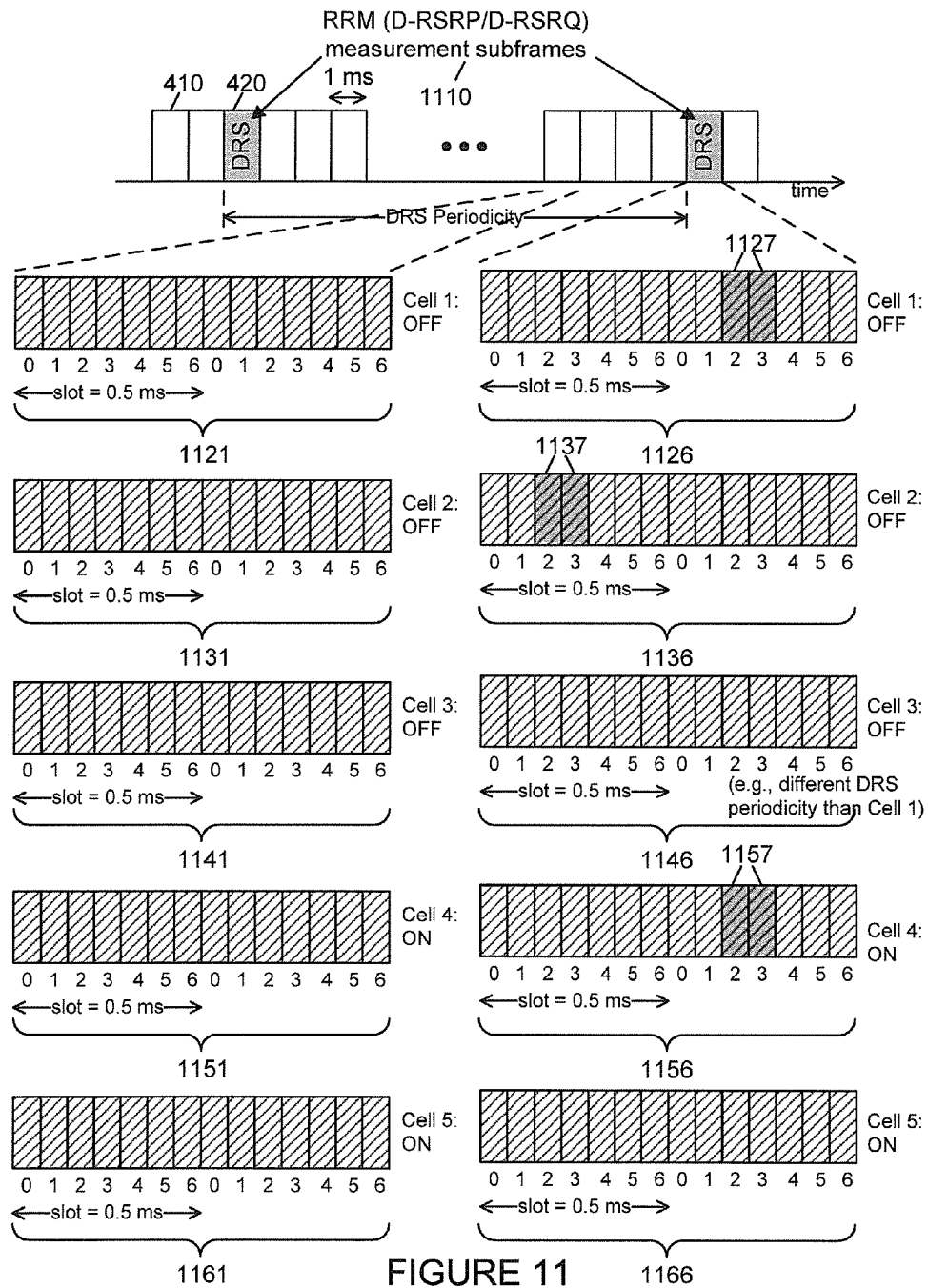
FIG. 11 illustrates a D-RSRP/D-RSRQ measurement scenario in accordance with embodiments of the present disclosure.

Combinations of the measurements as defined in Embodiment 1 and configured in Embodiment 2 may be utilized by the network to obtain a construction of different ratios of the strength of the serving and interfering cells depending on the on/off status at the time of the measurement by the UE. FIG. 11 provides an exemplary D-RSRP/D-RSRQ scenario.

Referring to FIG. 11, a UE measures D-RSRP/D-RSRQ in subframes where DRS are transmitted 1010 with respect to Cell 1. In a subframe 1120 containing no DRS in Cell 1 1121, assume there are no DRS in other cells (1131, 1141, 1151, 1161) which contributes to RSSI. The UE measures RSRP and RSSI and RSRQ is constructed and reported by the UE as RSRQ=N×RSRP/RSSI, where N is the number of RBs of the RSSI measurement bandwidth.

In a DRS subframe 1125, the D-RSRP corresponding to Cell 1 1126 is denoted as D-RSRP_Cell1, and is measured in OFDM symbols 1127 containing DRS resource elements with respect to Cell 1, and D-RSSI is measured with respect to all the symbols 1127 in subframe 1126 including DRS (i.e., unless denoted otherwise, in this embodiment D-RSSI is defined according to Definition 2 in Embodiment 1). D-RSRP_Cell2 is measured in OFDM symbols 1137 in subframe 1136 containing DRS resource elements with respect to Cell 2. Measurements on Cell3 in subframe 1146 and Cell5 in subframe 1166 do not need to be considered because they are not transmitting DRS in those subframes. D-RSRP_Cell4 is measured in OFDM symbols 1157 in subframe 1156 containing DRS resource elements with respect to Cell 4. Then, D-RSRQ w.r.t Cell 1 can be constructed as the ratio N×D-RSRP_Cell1/(D-RSSI−a×D-RSRP_Cell1−b×D-RSRP_Cell2−c×D-RSRP_Cell4), where N is the number of RBs of the D-RSSI measurement bandwidth, parameters a, b, and c are the respective number of REs that the D-RSRP is measured for Cell1, Cell2, and Cell4. Parameters a, b, and c can be preconfigured or notified to the UE. This is beneficial because the D-RSRQ does not consider the strength of the cells transmitting DRS which may be currently in an OFF state and do not otherwise contributed to interference at the measuring UE.

Alternatively, D-RSRQ with respect to Cell 1 is constructed as the ratio N×D-RSRP Cell1/(D-RSSI−a×D-RSRP_Cell1−b×D-RSRP_Cell2), if Cell4's DRS can be regarded as one of the signals contributing to the interference coming from on-state cells. This is beneficial because the D-RSRQ does not consider the strength of the cells transmitting DRS which are currently in an OFF state and do not otherwise contributed to interference at the measuring UE, but does consider the contribution of the cells in an off state which are transmitting DRS.

Alternatively, D-RSRQ with respect to Cell 1 can be constructed as the ratio N×D-RSRP_Cell1/(D-RSSI−b×D-RSRP_Cell2−c×D-RSRP_Cell4). Alternatively, D-RSRQ with respect to Cell 1 is constructed as the ratio N×D-RSRP_Cell1/(D-RSSI−b×D-RSRP_Cell2), if Cell4's DRS can be regarded as one of the signals contributing to the interference coming from on-state cells. It is noted that D-RSRP_Cell1 may not need to be subtracted from the denominator, to provide a reasonable range for the resulted D-RSRQ.

Alternatively, D-RSRQ can be constructed as the ratio N×D-RSRP_Cell1/RSSI, where RSSI is the one measured in subframe 1120 where no DRS exists.

Alternatively, instead of UE constructing D-RSRQ, the network can construct D-RSRQ based on UE's reports. For example, UE can report value N, D_RSRP_Cell1, D-RSRQ_Cell1 (which is derived as D-RSRQ_Cell1=N× D-RSRP/D-RSSI measured in subframe 1125), and D-RSRP_Cell2. Then the network can construct D-RSRQ with respect to Cell 1 as ratio N×D-RSRP_Cell1/(N×D-RSRP/D-RSRQ_Cell1−bxD-RSRP_Cell2). For another example, if in subframe 1120, RSRP and RSRQ is reported, then RSSI can be derived as RSSI=N×RSRP/RSRQ, and an alternative way for the network to construct D-RSRQ is constructed as the ratio N×D-RSRPCell1/RS SI.

To enable the above derivation of D-RSRQ, the network needs to know the cells (for example, Cell1-Cell5 in the example in FIG. 11) ON/OFF status as well as the information on which subframes contain DRS. For example, Cell 1 may need to know Cell2,3,4,5 ON/OFF status as well as the information on which subframes contain DRS. This information may be exchanged between the cells (e.g., via X2 interface), known at a central node controlling the on/off status of the cells, derived through over-the-air measurements, or UE measurement reports.

In One Embodiment (Embodiment 5—DRS Measurement Behavior)

As mentioned previously, one significant use case for the DRS is in the case a network is operating with cells transitioning between on and off states. For the purpose of DRS based measurements, since no other signals are expected during the dormant state a UE may only assume the presence of signals of the DRS. Specifically, for both intra- and inter-frequency measurement, if a UE is configured with only DRS-based measurements reporting on a given carrier frequency, and UE is not configured with an activated serving cell on that carrier frequency, the UE should not assume the presence of any signal and channel except for DRS in the DMTC (DRS measurement timing configuration) duration.

This may be applicable for PCells as well as SCells. CA-capable UE may have multiple SCells configured for the UE and the serving cell can activate or deactivate SCells if required. Network implementation can implicitly link cell on/off transition with SCell activation/deactivation. If a SCell is deactivated for a UE and it does not serve any other UEs, then this SCell can be dormant. If a dormant SCell is activated for a UE, then it should enter an on state.

Specifically, if a UE is configured with DRS based measurement for a serving SCell that is deactivated, the UE should not assume transmission of legacy signals (e.g., PSS/SSS/PBCH/CRS/CSI-RS) from that SCell, except for DRS transmissions until the subframe wherein the activation command is received at the UE.

As a result in order to support DRS measurement of a cell, there is a need to change the measurement behavior since legacy SCell measurement behavior allows for the configuration of measurements for a SCell, even when it is deactivated for a particular UE.

Alternative 1: One approach for DRS measurements of SCells is for the network to only configure DRS-measurements and never configure a SCell measurement cycle for any of the cells on a carrier frequency which is operating on/off. During the deactivated period of a SCell the UE performs measurements according to the configured DRS measurement period(s).

DRS measurements and the existing SCell measurement framework can coexist during ON and ON+DRS states of an activated SCell as a network implementation choice.

Alternative 2: If configured for legacy CRS and/or DRS measurement on the carrier frequency of a configured SCell(s), a UE autonomously suspends non-DRS measurements at SCell deactivation. During the deactivated period the UE only performs DRS measurements, while taking the configured MeasCycleSCell into account. By taking the MeasCycleSCell into account, the UE overrides the configured DRS measurement period.

In one sub-alternative the timer related to the DRS measurement period is suspended upon deactivation and the period of deactivation of the SCell does not count towards the DRS measurement timing at the UE. The timer resumes upon Ccell activation. In another sub-alternative the time related to the DRS measurement period is not suspended upon deactivation, however, the UE disables any measurement triggering based on the timing indicated by DRS measurement configuration.

Upon SCell activation, a UE resumes any non-DRS measurements for the respective cells. The DRS measurements in addition resume the periodicity given by the DRS measurement configuration upon SCell activation.

EXAMPLE

A UE is configured with a DRS measurement period of 80 ms and a MeasCycleSCell of 320 ms. Upon deactivation, the UE performs DRS measurements every 320 ms. The UE can assume that there are 4 DRS bursts within the MeasCycleSCell period which can be utilized for DRS measurement. Upon activation the UE may resume 80 ms DRS measurements.

In the case of Alternative 2, if DRS measurements are configured for the SCell, upon deactivation, the UE may still assume the presence of DRS transmissions at the configured periodicity indicated and potentially utilized by the UE for DRS measurement upon SCell activation.

In one sub-alternative, a UE may make measurements every DRS occasion (or a subset of DRS occasions) within the period indicated by MeasCycleSCell, while averaging one or more measurements before providing the measurement report according to the period indicated by MeasCycleSCell. Instead of averaging measurements, the UE may select one measurement for the report based on a predefined method such as a measurement criteria such as maximum, median, or minimum RSRP/RSRQ value(s), or maximum, median, or minimum number of detected cells(s), or based on a match of one or more cells provided by a cell-list configured by higher layers.

In another sub-alternative, a UE may select one DRS occasion within the period indicated by MeasCycleSCell to make a measurement before providing the measurement report according to the period indicated by MeasCycleSCell. The selection of the DRS occasion utilized for measurement may be based on a pre-defined method such as first, median, or last DRS occasion within the period indicated by MeasCycleSCell. The selection of the DRS occasion utilized for measurement may also be based on a determination such the time difference between DRS occasions utilized is minimized, especially when the periodicity of DRS occasions is not a multiple of MeasCycleSCell.

Alternative 3: If configured for legacy CRS and DRS measurement on the carrier frequency of a configured SCell(s), a UE autonomously suspends non-DRS measurements at SCell deactivation. During the deactivated period the UE only performs DRS measurements based on the configured DRS measurement period, overriding any configured MeasCycleSCell.

In one sub-alternative the timer related to the MeasCycleSCell is suspended upon deactivation and the period of deactivation of the SCell does not count towards the measurement timing at the UE. The timer resumes upon SCell activation. In another sub-alternative the time related to the MeasCycleSCell is not suspended upon deactivation, however the UE disables any measurement triggering based on the timing indicated by MeasCycleSCell.

Upon SCell activation, a UE resumes any non-DRS measurements for the respective cells.

Alternative 4: If configured for legacy CRS and DRS measurement on the carrier frequency of a configured SCell(s), a UE autonomously suspends non-DRS measurements at SCell deactivation. During the deactivated period the UE only performs DRS measurements based on the larger of the configured DRS measurement period or MeasCycleSCell if configured. Upon SCell activation, a UE resumes any non-DRS measurements for the respective cells.

Alternative 5: If configured for legacy CRS and DRS measurement on the carrier frequency of a configured SCell(s), a UE continues non-DRS measurements at SCell deactivation. During the deactivated period the UE performs DRS measurements based on the configured DRS measurement period, overriding any configured MeasCycleSCell while the legacy CRS measurements are based upon the configured MeasCycleSCell.

Alternative 6: If configured for legacy CRS and DRS measurement on the carrier frequency of a configured SCell(s), a UE continues non-DRS measurements at SCell deactivation. During the deactivated period the UE performs legacy CRS and DRS measurements based on the configured MeasCycleSCell.

It should be noted that the use of DRS-based measurements can be generally applicable as part of cell discovery, handover, SCell activation/deactivation, and dual connectivity procedures. Other solutions are also possible based on MAC or L1 procedures for operating small cell on/off.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE), comprising:
 a transceiver configured to receive orthogonal frequency division multiplexing (OFDM) symbols comprising common reference signals (CRS) and channel state information reference signal (CSI-RS)-based discovery reference signals (DRS); and
 a controller configured:
  when association of the UE with a secondary cell (SCell) is active, to measure the CRS of any neighboring cells with a first measurement timing configuration and, if the CSI-RS is configured, to measure the CSI-RS-based DRS of the SCell and the neighboring cells with the first measurement timing configuration, and
  upon deactivation of the association of the UE with the SCell, to measure the CRS of the SCell and the neighboring cells with a second measurement timing configuration and, if the CSI-RS is configured, to measure the CSI-RS-based DRS of the SCell and the neighboring cells with the second measurement timing configuration.

2. The UE according to claim 1, wherein a timer related to a CSI-RS-based DRS measurement period is suspended upon the deactivation of the association of the UE with the SCell.

3. The UE according to claim 2, wherein the timer resumes upon re-activation of the association of the UE with the SCell.

4. The UE according to claim 1, wherein a timer related to a CSI-RS-based DRS measurement period is not suspended upon the deactivation of the association of the UE with the SCell.

5. The UE according to claim 4, wherein measurement triggering based on a timing indicated by the first measurement timing configuration is disabled.

6. The UE according to claim 2, wherein CSI-RS-based DRS measurements for the SCell with the first measurement timing configuration are resumed upon re-activation of the association of the UE with the SCell.

7. The UE according to claim 6, wherein a periodicity of CSI-RS-based DRS measurements is resumed upon re-activation of the association of the UE with the SCell.

8. The UE according to claim 1, wherein a measurement timing parameter comprises a periodicity for the second measurement timing configuration.

9. The UE according to claim 1, wherein the second measurement timing configuration has a periodicity matching a periodicity of the first measurement timing configuration.

10. The UE according to claim 1, wherein the second measurement timing configuration has a periodicity differing from a periodicity of the first measurement timing configuration.

11. The UE according to claim 1, wherein the CSI-RS-based DRS is measured according to a periodicity of the first measurement timing configuration and the measurements are averaged and reported according to a periodicity of the second measurement timing configuration.

12. The UE according to claim 1, wherein the CSI-RS-based DRS is measured from a subset of measurement opportunities according to a periodicity of the first measurement timing configuration and the measurements are reported according to a periodicity of the second measurement timing configuration.

13. A method, comprising:
 receiving, at a user equipment (UE), orthogonal frequency division multiplexing (OFDM) symbols comprising one of common reference signals (CRS) and channel state information reference signal (CSI-RS)-based discovery reference signals (DRS); and
 when association of the UE with a secondary cell (SCell) is active, measuring the CRS of any neighboring cells with a first measurement timing configuration and, if the CSI-RS is configured, and measuring the CSI-RS-based DRS of the SCell and the neighboring cells with the first measurement timing configuration; and
 upon deactivation of association of the UE with the SCell, measuring the CRS of the SCell and the neighboring cells with a second measurement timing configuration and, if the CSI-RS is configured, measuring the CSI-RS-based DRS of the SCell and the neighboring cells with the second measurement timing configuration.

14. The method according to claim 13, wherein a timer related to a CSI-RS-based DRS measurement period is suspended upon the deactivation of the association of the UE with the SCell.

15. The method according to claim 14, wherein the timer resumes upon re-activation of the association of the UE with the SCell.

16. The method according to claim 13, wherein a timer related to a CSI-RS-based DRS measurement period is not suspended upon the deactivation of the association of the UE with the SCell.

17. The method according to claim 16, wherein measurement triggering based on a timing indicated by the first measurement timing configuration is disabled.

18. The method according to claim 14, wherein CSI-RS-based DRS measurements for the SCell with the first measurement timing configuration are resumed upon re-activation of the association of the UE with the SCell.

19. The method according to claim 18, wherein a periodicity of CSI-RS-based DRS measurements is resumed upon the re-activation of the association of the UE with the SCell.

20. The method according to claim 13, wherein a measurement timing parameter comprises a periodicity for the second measurement timing configuration.

21. The method according to claim 13, wherein the second measurement timing configuration has a periodicity matching a periodicity of the first measurement timing configuration.

22. The method according to claim 13, wherein the second measurement timing configuration has a periodicity differing from a periodicity of the first measurement timing configuration.

23. The method according to claim 13, wherein the CSI-RS-based DRS is measured according to a periodicity of the first measurement timing configuration and the measurements are averaged and reported according to a periodicity of the second measurement timing configuration.

24. The method according to claim 13, wherein the CSI-RS-based DRS is measured from a subset of measurement opportunities according to a periodicity of the first measurement configuration and the measurements are reported according to a periodicity of the second measurement configuration.

* * * * *